(12) United States Patent
Minamide et al.

(10) Patent No.: US 8,284,199 B2
(45) Date of Patent: Oct. 9, 2012

(54) GRAPH PLOTTING DEVICE AND GRAPH PLOTTING METHOD, YIELD ANALYZING METHOD AND YIELD IMPROVEMENT SUPPORT SYSTEM FOR EXECUTING THE GRAPH PLOTTING METHOD, PROGRAM, AND COMPUTER-READABLE RECORDING MEDIUM

(75) Inventors: Masahiko Minamide, Fukuyama (JP); Yoshio Takahashi, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1189 days.

(21) Appl. No.: 12/151,851

(22) Filed: May 8, 2008

(65) Prior Publication Data

US 2008/0278495 A1 Nov. 13, 2008

(30) Foreign Application Priority Data

May 11, 2007 (JP) ................................ P2007-126607

(51) Int. Cl.
*G06T 11/20* (2006.01)
(52) U.S. Cl. ......................... 345/440; 707/688
(58) Field of Classification Search .................. None
See application file for complete search history.

(56) References Cited

U.S. PATENT DOCUMENTS

| | | | | | |
|---|---|---|---|---|---|
| 5,557,716 A | * | 9/1996 | Oka et al. | ...................... | 345/440 |
| 5,581,678 A | * | 12/1996 | Kahn | ............................ | 345/440 |
| 6,057,837 A | * | 5/2000 | Hatakeda et al. | ............. | 715/765 |
| 6,691,123 B1 | * | 2/2004 | Gulliksen | ............................ | 1/1 |
| 7,047,484 B1 | * | 5/2006 | Becker et al. | ................ | 715/201 |
| 7,155,668 B2 | * | 12/2006 | Holland et al. | ............... | 715/256 |
| 2002/0016753 A1 | * | 2/2002 | Torii | ................................ | 705/35 |
| 2002/0022974 A1 | * | 2/2002 | Lindh | ............................... | 705/3 |
| 2004/0015783 A1 | * | 1/2004 | Lennon et al. | ................ | 715/523 |
| 2005/0060647 A1 | * | 3/2005 | Doan et al. | ..................... | 715/514 |
| 2005/0267835 A1 | * | 12/2005 | Condron et al. | ............... | 705/37 |
| 2006/0031187 A1 | * | 2/2006 | Pyrce et al. | ....................... | 707/1 |
| 2006/0244916 A1 | * | 11/2006 | Guillon | ......................... | 351/246 |

(Continued)

FOREIGN PATENT DOCUMENTS

JP 2000-285184 A 10/2000

(Continued)

OTHER PUBLICATIONS

Analyzing Quantitative Date, "Correlation Analysis", Jul. 29, 1999, URL: http://web.pdx.edu/~cgrd/corrxl.htm.*

(Continued)

*Primary Examiner* — James A Thompson
*Assistant Examiner* — David H Chu
(74) *Attorney, Agent, or Firm* — Edwards Wildman Palmer LLP; David G. Conlin; David A. Tucker

(57) ABSTRACT

In the present invention, a matrix display area for displaying m×n elements arranged in matrix form and a graph display area for displaying a graph image are set on an identical display screen. The m×n statistics between m variates belonging to a first data group and n variates belonging to a second data group are computed and displayed as matrix elements arranged in n rows and m columns in the matrix display area. A graph image representing a relation between two variates, one of which belongs to the first data group and the other of which belongs to the second data group, and corresponding to one matrix element specified by the matrix element specification section, is formed and displayed in the graph display area on the display screen.

13 Claims, 18 Drawing Sheets

U.S. PATENT DOCUMENTS

| | | | |
|---|---|---|---|
| 2007/0239415 A2 * | 10/2007 | Saito | 703/11 |
| 2007/0299798 A1 * | 12/2007 | Suyama et al. | 706/21 |
| 2009/0063374 A1 * | 3/2009 | Kasai | 706/12 |
| 2010/0229096 A1 * | 9/2010 | Maiocco et al. | 715/734 |
| 2011/0004489 A1 * | 1/2011 | Schoenberg et al. | 705/3 |

FOREIGN PATENT DOCUMENTS

| | | |
|---|---|---|
| JP | 2002-024204 A | 1/2002 |
| JP | 2005-012095 | 1/2005 |
| JP | 2006-252182 | 9/2006 |
| JP | 2007-019356 A | 1/2007 |

OTHER PUBLICATIONS

About.com, "Create a Template in Excel 2007", Oct. 14, 2007, URL: http://web.archive.org/web/20070908075850/http://spreadsheets.about.com/od/excel2007tips/qt/excel_template.htm.*

* cited by examiner

Fig.2

| PRODUCT ID | PERFORMANCE Q1 | PERFORMANCE Q2 | PERFORMANCE Q3 | PERFORMANCE Q4 | ... | PERFORMANCE QM | FACTOR F1 | FACTOR F2 | ... | FACTOR F6 | FACTOR F7 | FACTOR F8 | ... | FACTOR FN |
|---|---|---|---|---|---|---|---|---|---|---|---|---|---|---|
| Lt1 | 11.8 | 0.58 | 0.10 | 2217 | ... | $M_1$ | 56027 | 1455 | ... | 107.5 | 44.3 | 3828 | ... | $N_1$ |
| Lt2 | 15.6 | 0.56 | 0.10 | 2232 | ... | $M_2$ | 56136 | 1510 | ... | 102.5 | 44.9 | 3861 | ... | $N_2$ |
| Lt3 | 14.6 | 0.57 | 0.11 | 2222 | ... | $M_3$ | 54170 | 1415 | ... | 107.7 | 44.6 | 3685 | ... | $N_3$ |
| Lt4 | 14.7 | 0.56 | 0.10 | 2223 | ... | $M_4$ | 53492 | 1604 | ... | 106.9 | 44.0 | 3761 | ... | $N_4$ |
| Lt5 | 15.6 | 0.58 | 0.10 | 2229 | ... | $M_5$ | 58811 | 1504 | ... | 105.5 | 44.5 | 3805 | ... | $N_5$ |
| Lt6 | 15.6 | 0.57 | 0.10 | 2237 | ... | $M_6$ | 57341 | 1466 | ... | 109.8 | 44.5 | 3757 | ... | $N_6$ |
| Lt7 | 15.3 | 0.57 | 0.11 | 2245 | ... | $M_7$ | 57400 | 1439 | ... | 110.2 | 43.7 | 3789 | ... | $N_7$ |
| Lt8 | 15.4 | 0.57 | 0.10 | 2272 | ... | $M_8$ | 53741 | 1507 | ... | 106.9 | 44.4 | 3792 | ... | $N_8$ |
| Lt9 | 14.7 | 0.57 | 0.11 | 2218 | ... | $M_9$ | 58197 | 1504 | ... | 106.4 | 45.0 | 3831 | ... | $N_9$ |
| Lt10 | 14.9 | 0.56 | 0.10 | 2228 | ... | $M_{10}$ | 58431 | 1507 | ... | 109.4 | 44.3 | 3772 | ... | $N_{10}$ |
| ... | ... | ... | ... | ... | ... | ... | ... | ... | ... | ... | ... | ... | ... | ... |
| LtL | 14.7 | 0.56 | 0.10 | 2300 | ... | $M_L$ | 53487 | 1593 | ... | 108.0 | 44.8 | 3896 | ... | $N_L$ |

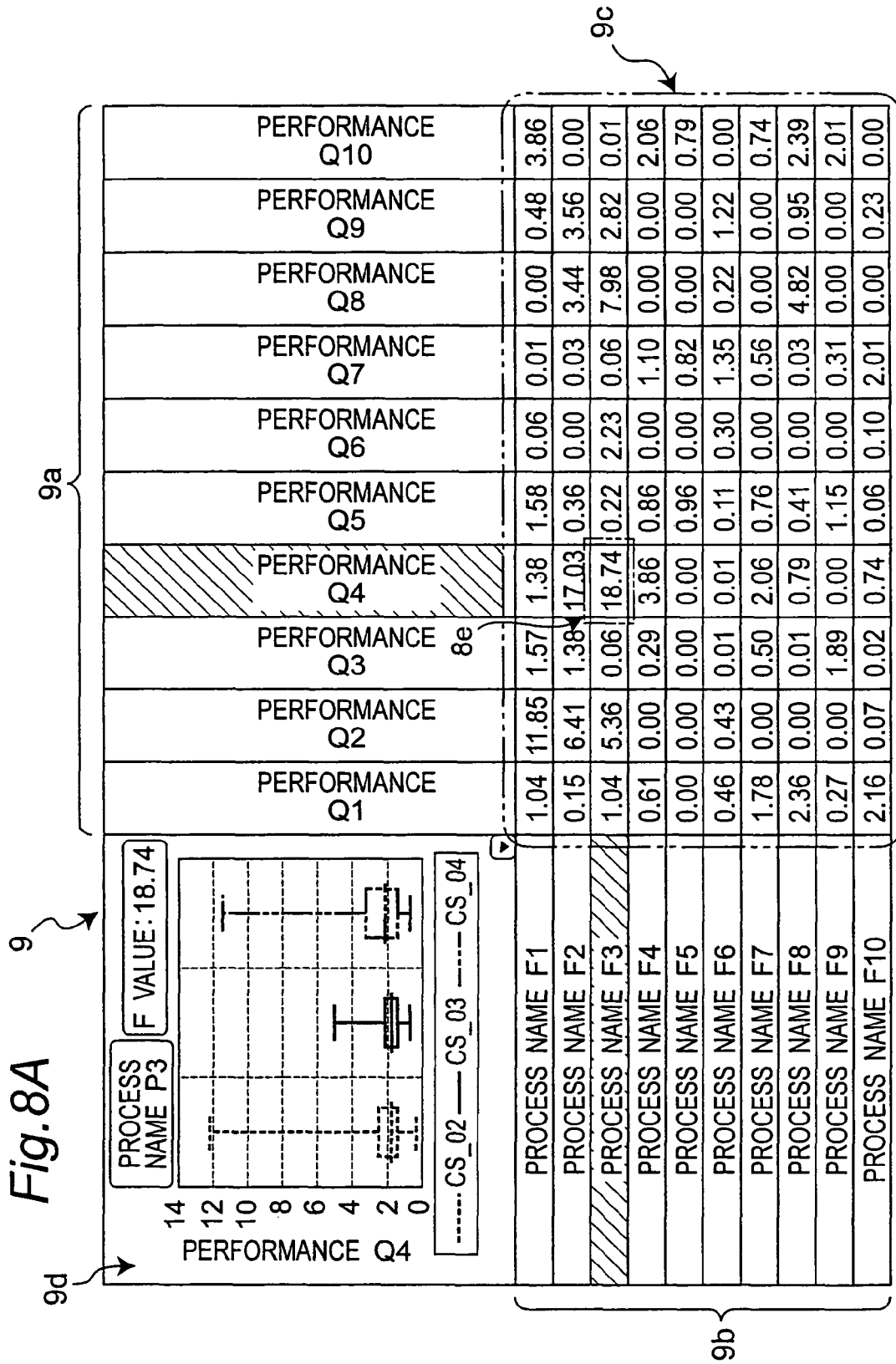

Fig.9

| PRODUCT ID | PERFORMANCE Q1 | PERFORMANCE Q2 | PERFORMANCE Q3 | PERFORMANCE Q4 | ... | PERFORMANCE QM | PROCESS NAME P1 | PROCESS NAME P2 | PROCESS NAME P3 | ... | PROCESS NAME P7 | PROCESS NAME P8 | ... | PROCESS NAME PO |
|---|---|---|---|---|---|---|---|---|---|---|---|---|---|---|
| Lt1 | 11.8 | 0.58 | 0.10 | 2.8 | ... | $M_1$ | DVD_04 | ETCH_01 | CS_02 | ... | IMP_02 | INS_02 | ... | $N_1$ |
| Lt2 | 15.6 | 0.56 | 0.10 | 2.6 | ... | $M_2$ | DVD_04 | ETCH_01 | CS_02 | ... | IMP_02 | INS_01 | ... | $N_2$ |
| Lt3 | 14.6 | 0.57 | 0.11 | 1.6 | ... | $M_3$ | DVD_04 | ETCH_01 | CS_04 | ... | IMP_02 | INS_01 | ... | $N_3$ |
| Lt4 | 14.7 | 0.56 | 0.10 | 1.7 | ... | $M_4$ | DVD_01 | ETCH_01 | CS_02 | ... | IMP_06 | INS_01 | ... | $N_4$ |
| Lt5 | 15.6 | 0.58 | 0.10 | 2.6 | ... | $M_5$ | DVD_01 | ETCH_01 | CS_03 | ... | IMP_06 | INS_02 | ... | $N_5$ |
| Lt6 | 15.6 | 0.57 | 0.11 | 2.6 | ... | $M_6$ | DVD_02 | ETCH_01 | CS_03 | ... | IMP_02 | INS_01 | ... | $N_6$ |
| Lt7 | 15.3 | 0.57 | 0.10 | 2.3 | ... | $M_7$ | DVD_01 | ETCH_03 | CS_04 | ... | IMP_04 | INS_02 | ... | $N_7$ |
| Lt8 | 15.4 | 0.57 | 0.11 | 2.4 | ... | $M_8$ | DVD_04 | ETCH_03 | CS_02 | ... | IMP_03 | INS_01 | ... | $N_8$ |
| Lt9 | 14.7 | 0.57 | 0.10 | 1.7 | ... | $M_9$ | DVD_04 | ETCH_01 | CS_03 | ... | IMP_01 | INS_01 | ... | $N_9$ |
| Lt10 | 14.9 | 0.56 | 0.10 | 1.9 | ... | $M_{10}$ | DVD_01 | ETCH_01 | CS_04 | ... | IMP_03 | INS_01 | ... | $N_{10}$ |
| ... | ... | ... | ... | ... | ... | ... | ... | ... | ... | ... | ... | ... | ... | ... |
| LtL | 14.7 | 0.56 | 0.10 | 1.7 | ... | $M_L$ | DVD_01 | ETCH_03 | CS_04 | ... | IMP_02 | INS_02 | ... | $N_L$ |

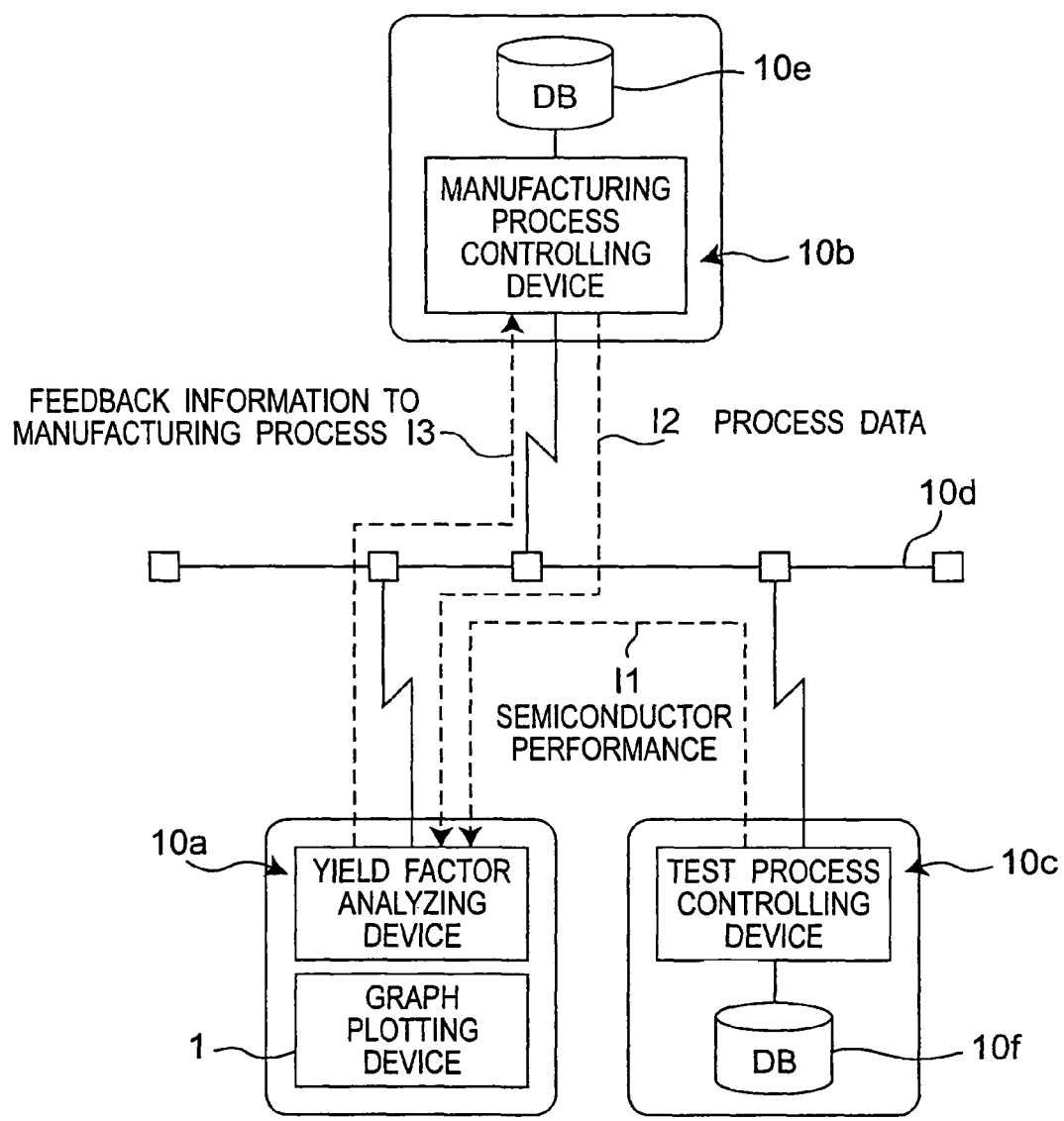

GRAPH PLOTTING DEVICE AND GRAPH PLOTTING METHOD, YIELD ANALYZING METHOD AND YIELD IMPROVEMENT SUPPORT SYSTEM FOR EXECUTING THE GRAPH PLOTTING METHOD, PROGRAM, AND COMPUTER-READABLE RECORDING MEDIUM

CROSS-REFERENCE TO RELATED APPLICATIONS

This Nonprovisional application claims priority under 35 U.S.C. §119(a) on Patent Application No. 2007-126607 filed in Japan on May 11, 2007, the entire contents of which are hereby incorporated by reference.

BACKGROUND OF THE INVENTION

The present invention relates to a graph plotting device and a graph plotting method, and more specifically relates to a device and a method for plotting graph representing correlation between one variate and another variate.

The present invention also relates to a yield analyzing method and a yield improvement support system which performs yield analysis while plotting a graph by executing such a graph plotting method.

The present invention also relates to a computer-readable program for executing those methods.

The present invention also relates to a computer-readable recording medium storing those methods.

In the fields such as the semiconductor product manufacturing field, a large amount of data of many kinds, such as processing shapes (line width, oxide film thicknesses, etc.) and processing lapse time in product processing, are collected to perform process-data analysis, one of the key objectives of which is to extract defective factors of the products.

For example, techniques for defective factor analysis have been disclosed in JP 2005-12095 A including a technique of extracting process data with a large coefficient of correlation by using such analyses as a correlation analysis between the yield and process data linked to each other for every production lot in the manufacturing process and a correlation analysis between product performance and process data etc., and a technique of extracting a variation degree of low-yield lot as a significant difference by linking machines, manufacturing steps and operators processed based on the processing information on the low-yield lot. These techniques are used to identify one specific manufacturing process or manufacturing machine which is a defective factor.

Such analysis of process data is usually performed on all the collected process data sets. However, products may have many defective factors, which may intricately be intertwined with each other. Even if a correlation is present between specific two variates included in a data group, the values of target variates are often changed by the influence of the values of other variates, resulting in no apparent correlation being present therebetween. Therefore, it is usually difficult to extract latent correlations.

Accordingly, in order to help people judge in the above defective factor analysis, the correlation between data sets is usually indicated in graph form on a display screen. There are conventional graph plotting techniques for displaying graphs of all the relations between a plurality of variates belonging to one data group and a plurality of variates belonging to another data group across the screen to capacity or for displaying the correlation between specific two variates by specifying each variate with use of input devices such as keyboards and mouse devices.

The correlations between process data sets on hundreds of steps in the manufacturing process may not be characterized by one element but rather trade-off relations may be present between a plurality of data sets. It is very difficult to efficiently compare a trade-off relation between graphs drawn at the opposite edges of the screen, causing a problem that a lot of analysis time and effort are needed.

SUMMARY OF THE INVENTION

Accordingly, an object of the present invention is to provide a graph plotting device and a graph plotting method which can efficiently specify two arbitrary variates between a plurality of variates belonging to one data group and a plurality of variates belonging to another data group, and which can display the correlation between those two variates so as to be clear and easy to see.

Another object of the present invention is to provide a yield analyzing method and a yield improvement support system which perform yield analysis while plotting a graph by executing such a graph plotting method.

Still another object of the present invention is to provide a computer-readable program for executing those methods.

Yet another object of the present invention is to provide a computer-readable recording medium storing those methods.

In order to achieve the object, a graph plotting device of the present invention comprises:

a display area setting section which sets a matrix display area for displaying m×n elements arranged in matrix form wherein m and n are respectively two or more natural numbers and a graph display area for displaying a graph image in an identical display screen;

a statistic display processing section which computes m×n statistics between m variates belonging to a first data group and n variates belonging to a second data group and which displays the statistics as matrix elements arranged in n rows and m columns in the matrix display area;

a matrix element specification section for specifying any one of the matrix elements displayed in the matrix display area on the display screen; and a graph display processing section which forms a graph image representing a relation between two variates, one of which belongs to the first data group and the other of which belongs to the second data group, corresponding to one matrix element specified by the matrix element specification section, and which displays the graph image in the graph display area on the display screen.

The "first data group" and "second data group" may include different kinds of data groups such as a data group representing the performance of a certain object and a data group representing a defective factor thereof.

In the graph plotting device of the present invention, the display area setting section sets the matrix display area for displaying m×n elements arranged in matrix form, and the graph display area for displaying a graph image on an identical display screen. The statistic display processing section computes m×n statistics between m variates belonging to the first data group and n variates belonging to the second data group and displays the statistics as matrix elements arranged in n rows and m columns in the matrix display area. The matrix element specification section specifies any one of the matrix elements displayed in the matrix display area on the display screen. The graph display processing section forms a graph image representing a relation between two variates, one of which belongs to the first data group and the other of which belongs to the second data group, and corresponding to one matrix element specified by the matrix element specification section, and displays the graph image in the graph display area on the display screen.

In this case, a user (indicating those who operate the device including operators) has only to specify any one of the matrix elements displayed in the matrix display area on the display screen via the matrix element specification section in order to simultaneously specify a variate belonging to the first data group and a variate belonging to the second data group corresponding to the specified matrix element. And the graph display processing section can display the relation between those two specified variates so as to be easy to see. Therefore, the user can efficiently extract the relation between two desired variates from a large amount of data of many kinds, and can display the relation so as to be clear and easy to see. As a result, ranking by the relation (e.g., coefficient of correlation) between the variates in the two groups is facilitated, which allows easy analysis of relations such as trade-off relations between multivariates.

It is to be noted that the statistic display processing section may display m×n statistics in the matrix display area as matrix elements arranged in m rows and n columns instead of in n rows and m columns.

In the graph plotting device of one embodiment, each of the statistics is a coefficient of correlation between the variate belonging to the first data group and the variate belonging to the second data group.

In the graph plotting device of this one embodiment, the statistic display processing section displays coefficients of correlation between variates belonging to the first data group and variates belonging to the second data group in the matrix display area as matrix elements arranged in n rows and m columns. Therefore, the user can easily select, for example, larger coefficients of correlation among the displayed coefficients of correlation.

The graph plotting device of one embodiment further comprises:

a link data table for storing m variates belonging to the first data group and n variates belonging to the second data group in a state of being associated to each other with use of a common identifier, wherein the statistic display processing section computes the m×n statistics by referring to a memory content of the link data table.

In the graph plotting device of this one embodiment, storing various data groups in the link data table allows the user to display a relation between the variates of two group specified out of various data groups in the graph display area on the display screen so as to be easy to see.

In the graph plotting device of one embodiment, the display area setting section sets the matrix display area and the graph display area as a template incorporated into one frame.

In the graph plotting device of this one embodiment, the matrix display area and the graph display area, which are incorporated in the template, respectively occupy a fixed position on the display screen on a constant basis. Therefore, it becomes easy for the user to recognize the display content of the screen.

In the graph plotting device of one embodiment, the matrix element specification section specifies any one of the matrix elements on the display screen.

The term "specify" on the display screen is used to refer to the action, which is, for example, to move a cursor onto a certain matrix element with a mouse and to specify the matrix element by clicking.

In the graph plotting device of this one embodiment, a variate belonging to the first data group and a variate belonging to the second data group can efficiently be specified simultaneously with one operation (e.g., one click).

In the graph plotting device of one embodiment, the display area setting section sets a first variate name display area which displays names of m variates belonging to the first data group so as to be arranged in row direction corresponding to each column in the matrix display area, and a second variate name display area which displays names of n variates belonging to the second data group so as to be arranged in column direction corresponding to each row in the matrix display area, and wherein the graph plotting device further comprising a variate name display processing section which displays the names of m variates and the names of n variates in the first and second variate name display areas, respectively.

In the graph plotting device of this one embodiment, seeing the names of the variates displayed in the first and second variate name display areas allows the user to easily recognize which data group the respective variates that constitute the statistics displayed on the matrix display area belong to.

The graph plotting device of one embodiment further comprises:

a variate name specification section which specifies any one of the names of m variates or the names of n variates; and an arrangement order processing section which rearranges statistics displayed in the matrix display area by each row so that when one of the names of m variates is specified by the variate name specification section, n statistics lined in column direction with respect to the variate whose name is specified are arranged in order of absolute values, while rearranging statistics displayed in the matrix display area by each column so that when one of the names of n variates is specified by the variate name specification section, m statistics lined in row direction with respect to the variate whose name is specified are arranged in order of absolute values.

Herein, the "order" of rearrangement includes an ascending order and a descending order.

In the graph plotting device of this one embodiment, specifying one of the names of m variates via the variate name specification section allows the user to rearrange n statistics, which are lined in column direction with respect to the variate whose name is specified, in order of absolute values with the arrangement order processing section. Moreover, specifying one of the names of n variates via the variate name specification section allows the user to rearrange m statistics, which are lined in row direction with respect to the variate whose name is specified, in order of absolute values with the arrangement order processing section. As a result, the operator can clearly and easily understand the ranking by the relation (e.g., coefficient of correlation) between the variates of two groups.

In the graph plotting device of one embodiment, the graph image is displayed in the graph display area with a first coordinate axis expressing the variates belonging to the first data group and a second coordinate axis expressing the variates belonging to the second data group as references, and wherein when specification is changed from the one matrix element into the another matrix element by the matrix element specification section, the graph display processing section determines whether or not a row or a column of the one matrix element coincides with that of the another matrix element, and if the row of the one matrix element coincides with the row of the another matrix element, a scale of the second coordinate axis is maintained, whereas if the column of the one matrix element coincides with the column of the another matrix element, a scale of the first coordinate axis is maintained, while a graph image representing a relation between two variates, one of which belongs to the first data group and the other of which belongs to the second data group, and corresponding to the another matrix element, is formed.

In the graph plotting device of this one embodiment, when specification by the matrix element specification section is changed from the one matrix element to the another matrix element, the graph display processing section determines whether or not a row or a column of the one matrix element coincides with that of the another matrix element, and if the row of the one matrix element coincides with the row of the another matrix element, the graph display processing section maintains a scale of the second coordinate axis while forming a graph image representing a relation between two variates, one of which belongs to the first data group and the other of which belongs to the second data group, corresponding to the another matrix element. If the column of the one matrix element coincides with the column of the another matrix element, the graph display processing section maintains a scale of the first coordinate axis while forming a graph image representing a relation between two variates, one of which belongs to the first data group and the other of which belongs to the second data group, corresponding to the another matrix element. Therefore, when specification of only one variate is changed out of a variate belonging to the first data group and a variate belonging to the second data group, the user can easily recognize the tendency of change of the graph image relating to the changed specification.

The graph plotting device of one embodiment further comprises:

a server which periodically distributes m variates belonging to the first data group and n variates belonging to the second data group to the link data table so as to update the memory content of the link data table, wherein the statistic display processing section computes the m×n statistics in synchronization with the update of the memory content of the link data table and displays the statistics in the matrix display area.

In the graph plotting device of this one embodiment, the statistic display processing section computes the m×n statistics in synchronization with the update of the memory content of the data table and displays the statistics in the matrix display area. In short, required calculation is automatically performed. Therefore, the user can acquire required information in real time.

A graph plotting method of the present invention comprises steps for:

setting a matrix display area for displaying m×n elements arranged in matrix form wherein m and n are respectively two or more natural numbers and a graph display area for displaying a graph image in an identical display screen;

computing m×n statistics between m variates belonging to a first data group and n variates belonging to a second data group and displaying the statistics as matrix elements arranged in n rows and m columns in the matrix display area;

specifying any one of the matrix elements displayed in the matrix display area on the display screen; and forming a graph image representing a relation between two variates, one of which belongs to the first data group and the other of which belongs to the second data group, corresponding to one matrix element specified by the matrix element specification section, and displaying the graph image in the graph display area on the display screen.

According to the graph plotting method of the present invention, a user has only to specify any one of the matrix elements displayed in the matrix display area on the display screen in order to simultaneously specify a variate belonging to the first data group and a variate belonging to the second data group corresponding to the specified matrix element. And the relation between those two specified variates are displayed so as to be easy to see. Therefore, the user can efficiently extract the relation between two desired variates from a large amount of data of many kinds, and can display the relation so as to be clear and easy to see. As a result, ranking by the relation (e.g., coefficient of correlation) between the variates in the two groups is facilitated, which allows easy analysis of relations such as trade-off relations between multivariates.

A yield analyzing method of the present invention is a yield analyzing method for analyzing a cause of abnormality in manufacturing process for manufacturing a certain product by executing said graph plotting method, wherein the first data group is a data group representing performance of the product, while the second data group is a data group representing a defective factor of the product, and the yield analyzing method further comprises a step for:

extracting a defective factor of the product while executing the graph plotting method to display a graph image representing a relation between the two variates, one of which belongs to the data group representing the performance and the other of which belongs to the data group representing the defective factor, in the graph display area on the display screen.

In the yield analyzing method of the present invention, a defective factor of the product is extracted while the graph plotting method is executed to display a graph image representing a relation between the two variates, one of which belongs to the data group representing the performance and the other of which belongs to the data group representing the defective factor, in the graph display area on the display screen. Therefore, the user can extract a defective factor with ease and sufficient accuracy, without needing much analysis time and effort.

In the yield analyzing method of one embodiment, the graph image is a boxplot relating to the variate belonging to the data group representing the performance which depends on the variate belonging to the data group representing the defective factor.

In the yield analyzing method of this one embodiment, with the boxplot relating to the variate belonging to the data group representing the performance which depends on the variate belonging to the data group representing the defective factor, the operator can clearly understand which defective factor causes deterioration of the performance on one screen. Therefore, a defective factor can be extracted with ease and sufficient accuracy without much analysis time and effort.

A yield improvement support system of the present invention is a yield improvement support system comprising said graph plotting device for eliminating a cause of abnormality in manufacturing process for manufacturing a certain product, wherein the first data group is a data group representing performance of the product, while the second data group is a data group representing a defective factor of the product, the yield improvement support system further comprises:

a defective factor feedback section which extracts a defective factor of the product while displaying a graph image representing a relation between the two variates, one of which belongs to the data group representing the performance and the other of which belongs to the data group representing the defective factor, in the graph display area on the display screen with the graph plotting device, and which outputs the extracted defective factor as a feedback to the manufacturing process.

In the yield improvement support system of the present invention, a defective factor of the product is extracted while a graph image representing a relation between the two variates, one of which belongs to the data group representing the performance and the other of which belongs to the data group representing the defective factor, is displayed in the graph display area on the display screen by the graph plotting device. Therefore, a defective factor can be extracted with ease and sufficient accuracy without much analysis time and effort. The defective factor feedback section outputs the extracted defective factor as a feedback to the manufacturing process. Therefore, the cause of abnormality in the manufacturing process can be eliminated. As a result, the manufacturing process can be stabilized and thereby the improvement in the yield can be supported.

A program of the present invention is a program for allowing a computer to execute said graph plotting method.

According to the program of the present invention, it becomes possible to allow a computer to execute the graph plotting method or the yield analyzing method.

A recording medium of the present invention is a computer-readable recording medium for allowing a computer to execute said program.

According to the recording medium of the present invention, allowing a computer to read the record content of the recording medium enables the computer to perform the graph plotting method or the yield analyzing method.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a view showing an example of the content of a link data table storing the data targeted for graph plotting by the graph plotting device;

FIG. 8A is a view showing an example of the display content displayed in each area of the graph plotting template when the graph plotting device is used for yield analysis;

FIG. 9 is a view showing an example of the content of the link data table in the case of using the graph plotting device for yield analysis;

FIG. 10 is a view showing the entire configuration of a yield improvement support system including the graph plotting device;

DETAILED DESCRIPTION OF THE INVENTION

Hereinbelow, the present invention will be described in details in conjunction with the embodiments with reference to the drawings.

First Embodiment

FIG. 2 shows an example of the content of a link data table 2 storing the data targeted for graph plotting by a later-described graph plotting device in one embodiment. In this example, the link data table 2 stores "performance" Q1, Q2, . . . , QM as M variates belonging to a first data group 2a and "factor" F1, F2, . . . , FN as N variates belonging to a second data group 2b so as to be associated with (linked to) each other for every product lot, Lt1, Lt2, . . . , LtL.

In an example in the semiconductor manufacturing field, the data represented by "performance" Q1, Q2, QM is, for example, the performance of a device obtained by wafer test, electric characteristics test and the like, whereas the data represented by "factor" F1, F2, . . . , FN is process data on oxide film thicknesses, line width and examination, or the like.

Each product lot is specified by L "product IDs" Lt1, Lt2, . . . , LtL as common identifiers 2c. In short, in the link data table 2, "performance" Q1, Q2, . . . , QM as M variates and "factor" F1, F2, . . . , FN as N variates are associated with each other per row by L identifiers (lot numbers) Lt1, Lt2, . . . , LtL.

It is to be noted that the operator can store various data groups in the link data table 2.

Figure 1:
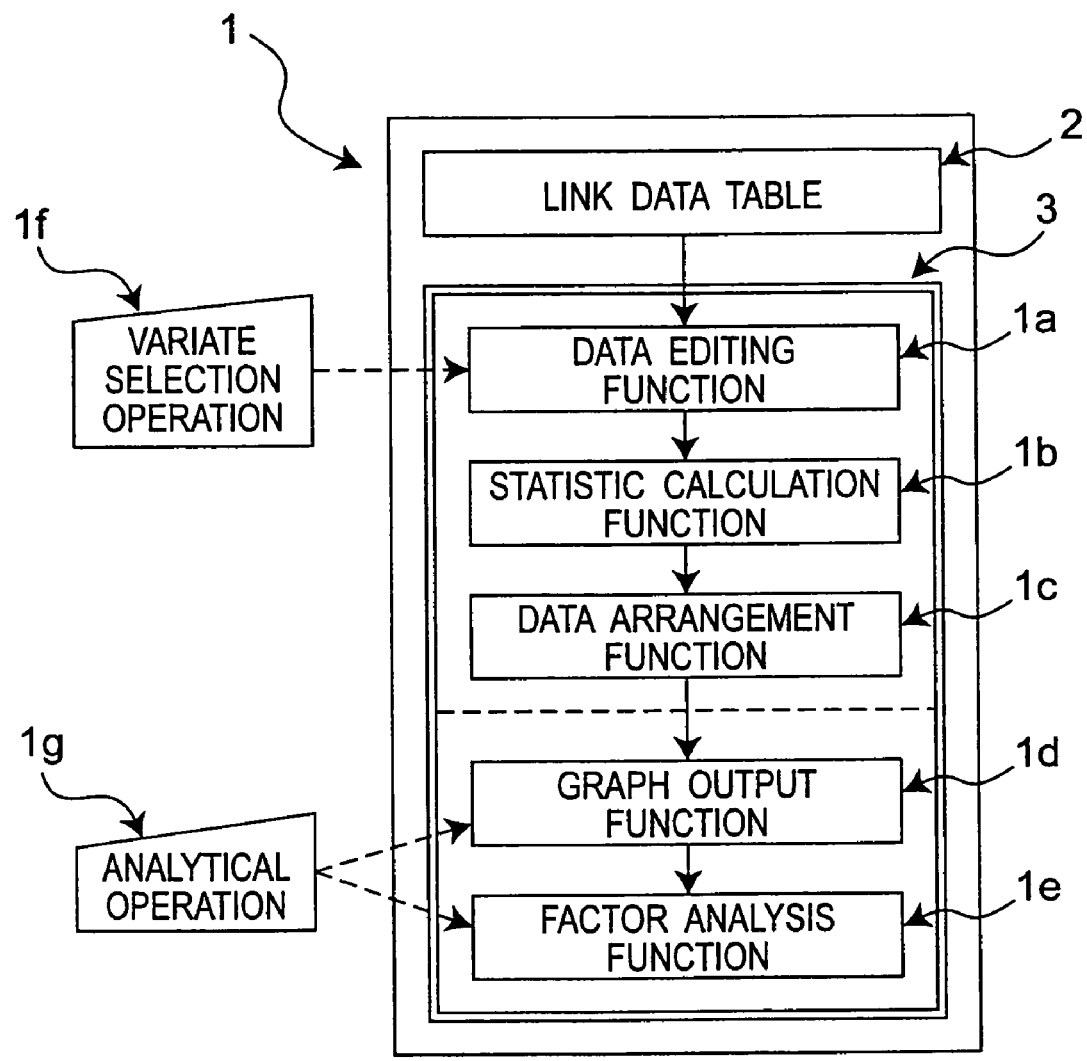
FIG. 1 is a schematic block diagram showing a graph plotting device in one embodiment of the present invention.

FIG. 1 is a schematic block diagram showing a graph plotting device 1 in one embodiment of the present invention. The graph plotting device includes a link data table 2 shown in FIG. 2, a graph plotting template section 3 for indication with use of a later-described graph plotting template, a variate selection operation section 1f for the operator to specify an analysis object from multivariates stored in the link data table 2 shown in FIG. 2, and a later-described analytical operation section 1g for the operator to specify two variates on a display screen. The graph plotting template section 3 includes a data editing function section 1a for editing M variates and N variates as analysis objects selected by the variate selection operation section 1f, a statistic calculation function section 1b for computing (M×N) statistics (e.g., coefficients of correlation), a data arrangement function section 1c for arranging (M×N) statistics as matrix elements in N rows and M columns, a graph output function section 1d for plotting the relation between two variates specified by the analytical operation section 1g on the display screen, and a factor analysis function section 1e for analyzing the relations between multivariates.

Each part of the graph plotting template section 3 is constituted of a CPU (Central Processing Unit) which operates by a predetermined program. The link data table 2 is constituted of an external storage such as hard disk drives. The variate selection operation section 1f is constituted of an input device such as mouse devices and keyboards. Moreover, the analytical operation section 1g is constituted of a publicly known touch-sensitive LCD (Liquid Crystal Display) for inputting data by touching a certain part of the display screen with, for example, a pen. It is to be noted that the analytical operation section 1g may naturally employ an input method involving cursor movement on the display screen with a mouse and click operation to specify a certain part in the display screen.

Figure 4:
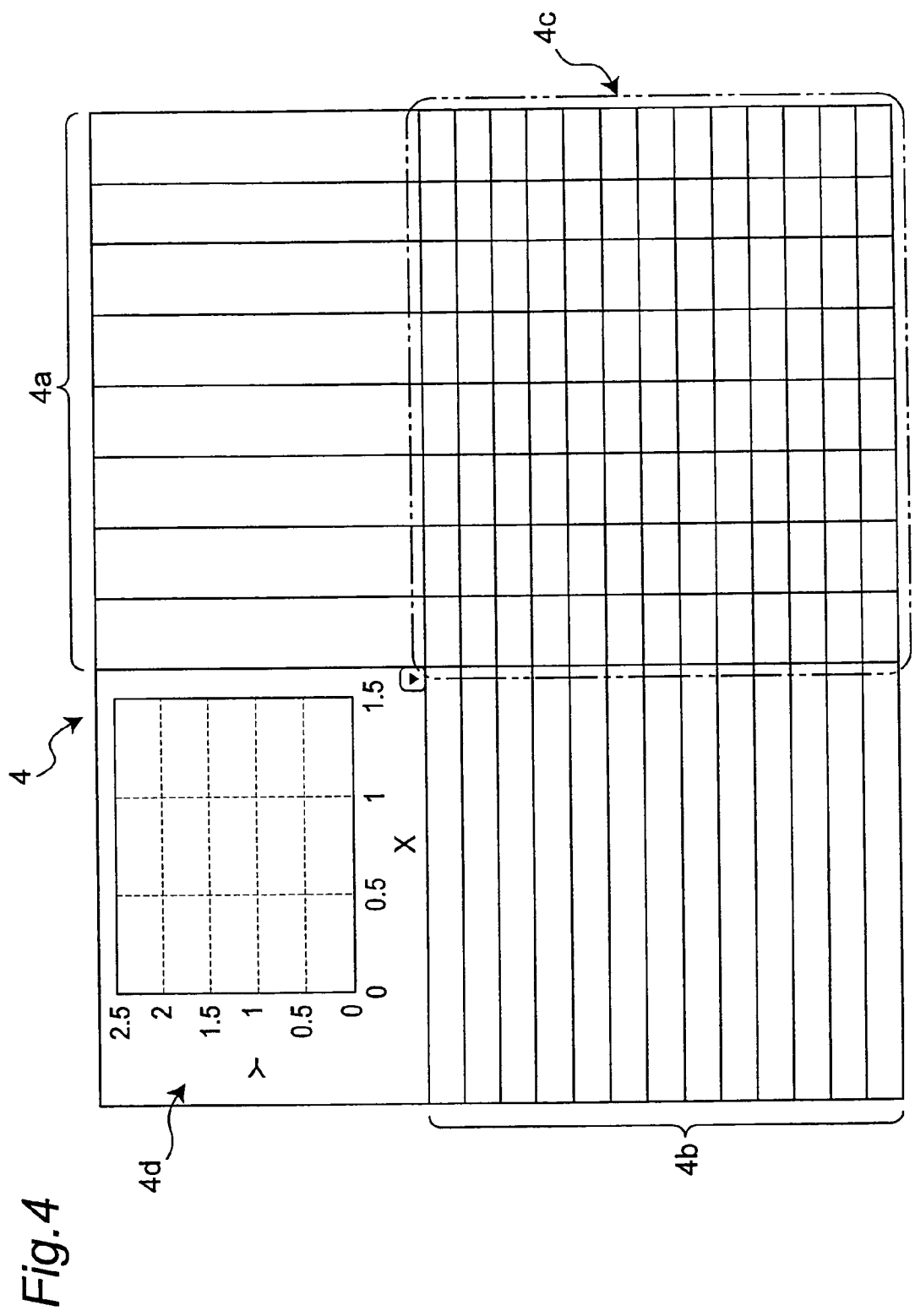
FIG. 4 is a view showing the initial state of the graph plotting template.

FIG. 4 shows an initial state of the graph plotting template 4 set on the display screen by the graph plotting template section 3 functioning as a display area setting section. The template 4 in this example is configured so that a matrix display area 4c for displaying (M×N) statistics arranged in matrix form is placed at the lower right side, a first variate name display area 4a at the upper right side, a second variate name display area 4b at the lower left side and a graph display area 4d at the upper left side and that these areas 4a to 4d are incorporated into one rectangular frame displayed on the same display screen.

Figure 3:
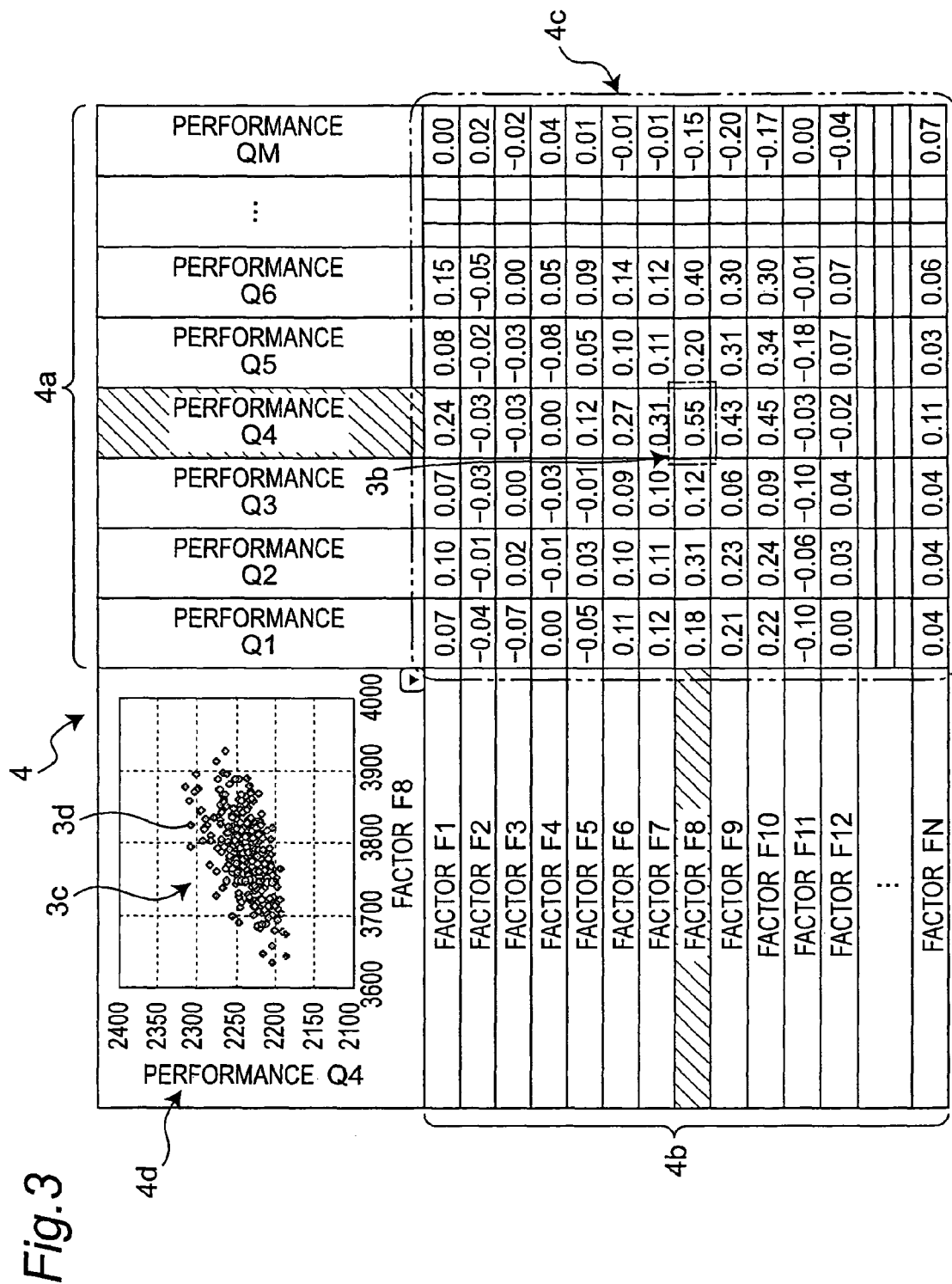
FIG. 3 is a view showing an example of the display content displayed in each area of a graph plotting template.

FIG. 3 is a view showing an example of the display content displayed in each area 4a to 4d of the graph plotting template 4.

In the matrix display area 4c, by the data arrangement function section 1c and the statistic calculation function section 1b functioning as a statistic display processing section, (M×N) statistics, which is (M×N) coefficients of correlation between "performance" Q1, Q2, . . . , QM that are M variates belonging to the first data group 2a and "factor" F1, F2, . . . , FN that are N variates belonging to the second data group 2b in this example, are displayed as matrix elements arranged in N rows and M columns. Therefore, the user can easily select, for example, larger coefficients of correlation among the displayed coefficients of correlation.

In the first variate name display area 4a, by the graph plotting template section 3 functioning as a variate name display processing section, the names of M variates belonging to the first data group 2a, that is, "performance Q1", "performance Q2", . . . , "performance QM" in this example, are displayed so as to be arranged in row direction corresponding to each column of the matrix display area 4c. Similarly, in the second variate name display area 4b, the names of N variates belonging to the second data group 2b, that is, "factor F1", "factor F2", . . . , "factor FN" in this example, are displayed so as to be arranged in column direction corresponding to each row of the matrix display area 4c. Consequently, seeing the names of the variates displayed in the first and second variate name display areas 4a, 4b allows the operator to easily recognize which data group the respective variates that constitute the statistics displayed on the matrix display area 4c belong to.

In the graph display area 4d, by the graph output function section 1d functioning as a graph display processing section, a graph image showing the relation between two variates, one of which belongs to the first data group 2a and the other of which belongs to the second data group 2b, is displayed. In this example, the operator uses the analytical operation section 1g as a matrix element specification section, so that corresponding to the specified matrix element 3b in the eighth row and fourth column (i.e., coefficient of correlation "0.55") among the matrix elements displayed in the matrix display area 4c on the display screen, a scatter diagram 3c showing the correlation between the performance Q4 corresponding to the column (fourth column) and the factor F8 corresponding to the row (eighth row) is displayed.

It is to be noted that, in this example, the scatter diagram 3c is displayed with a vertical axis (Y-axis) as a first coordinate axis representing a variate that is "performance Q4" belonging to the first data group 2a, and a horizontal axis (X-axis) as a second coordinate axis representing a variate that is "factor F8" belonging to the second data group 2b as references. Each dot 3d in the scatter diagram 3c represents data on a certain product lot, respectively. It is to be noted that the vertical axis and the horizontal axis may be replaced and displayed.

Thus, in the graph plotting device 1, in conjunction with the analytical operation by the operator to specify a matrix element in the matrix display area 4c through the analytical operation section 1g, a graph image corresponding to the specified matrix element (relation between specified two variates) is displayed in the graph display areas 4d. According to the above-mentioned input method involving specifying any one of the matrix elements displayed in the matrix display area 4c through the analytical operation section 1g, a variate belonging to the first data group 2a and a variate belonging to the second data group 2b can efficiently be specified with one operation (e.g., one touch) simultaneously.

Figure 11:
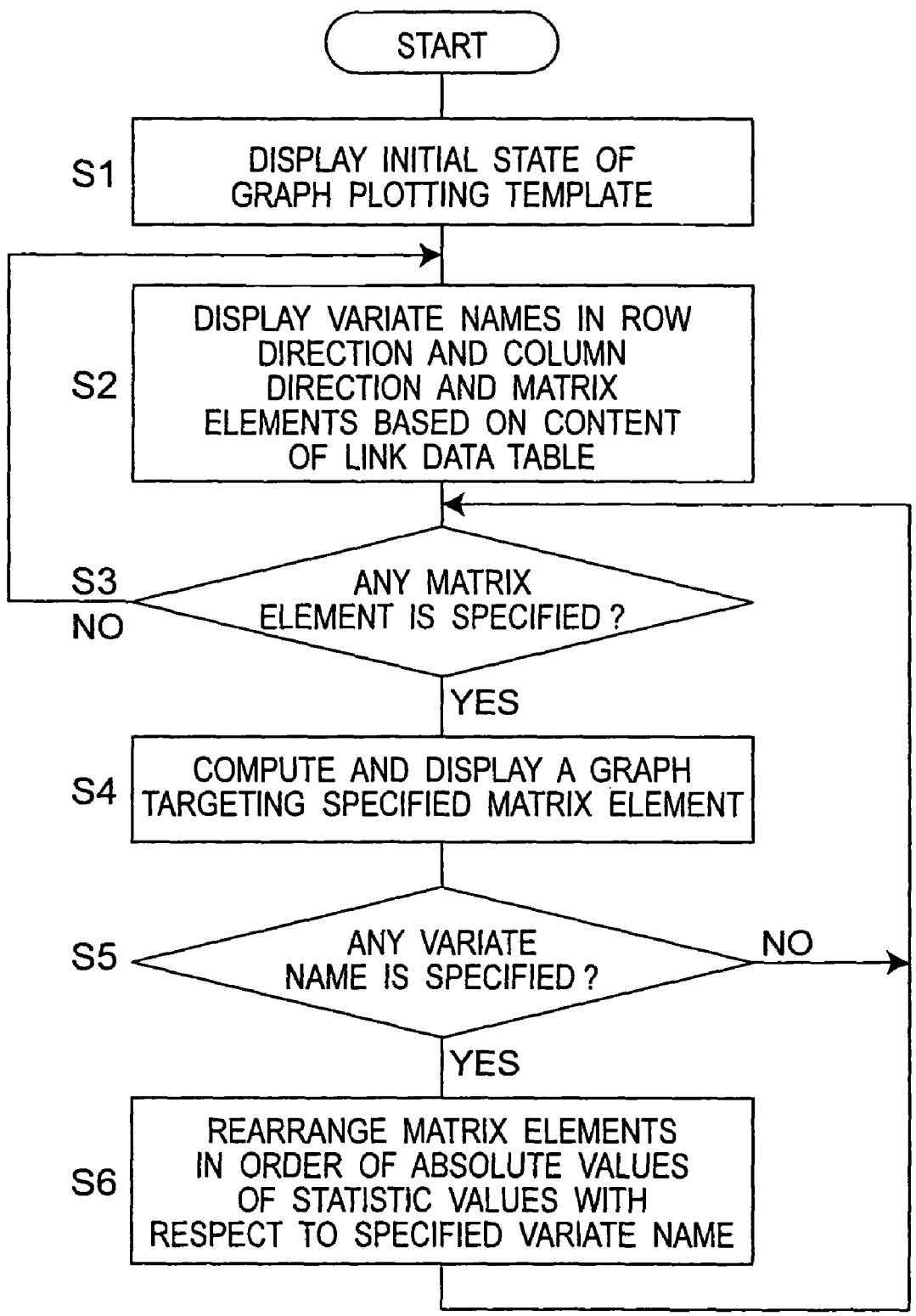
FIG. 11 is a view showing the flow of the graph plotting method by the graph plotting device.
Figure 12:
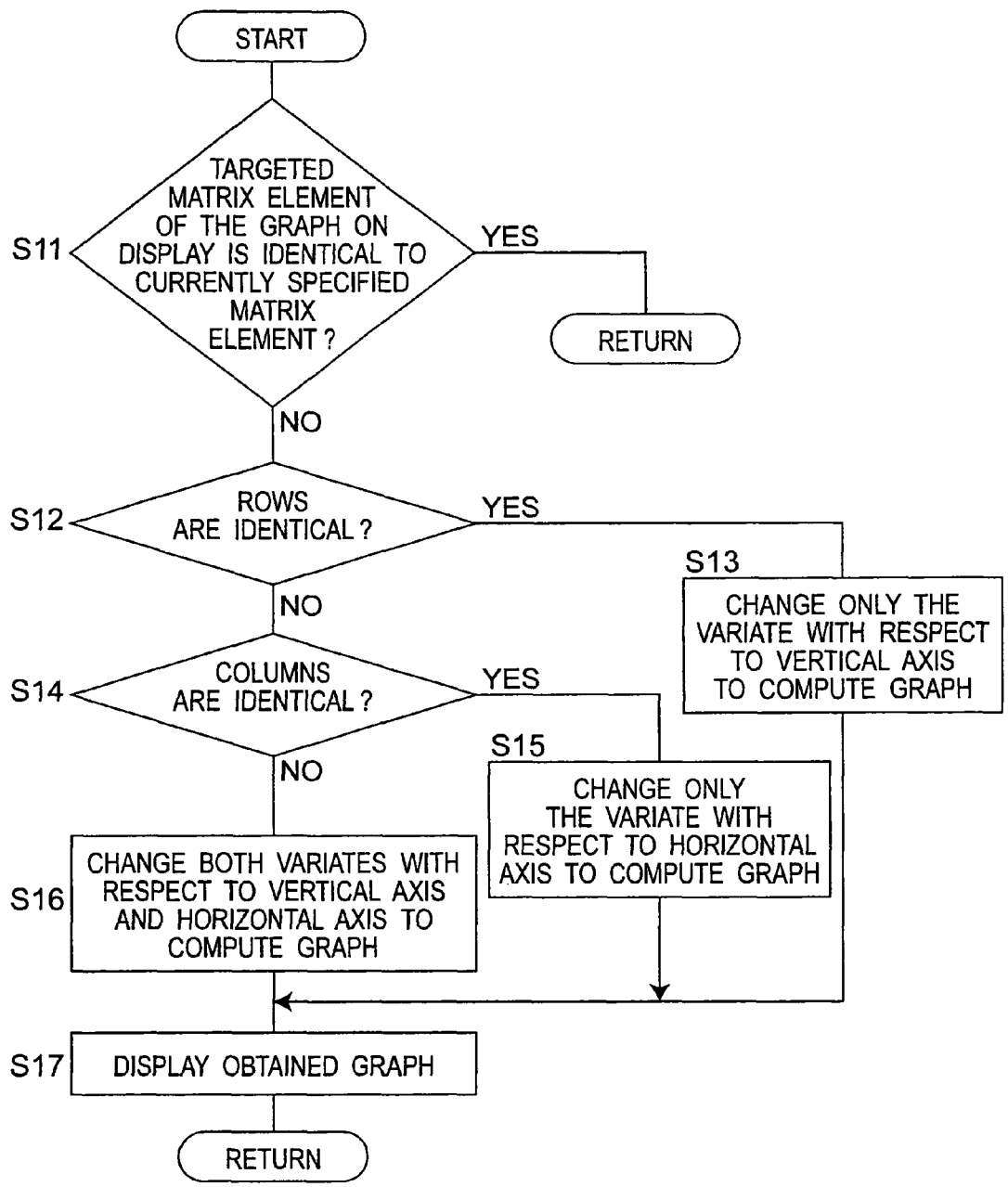
FIG. 12 is a detailed view showing the process flow of Step S4 in FIG. 11.

Description is now given of the graph plotting method by the graph plotting device 1 based on the flow in FIG. 11 and FIG. 12. As the premise, the content of the link data table 2 shall be pre-edited by the operator as shown in FIG. 2.

As shown in FIG. 11, when operation of the graph plotting device 1 starts, the initial state of the graph plotting template 4 (see FIG. 4) is first displayed on the display screen in Step S1.

Next, in Step S2 in FIG. 11, variate names in row direction and column direction and matrix elements are displayed based on the content of the link data table 2. In this example, as shown in FIG. 5 A, "performance Q1", "performance Q2", . . . , "performance Q10" are displayed in the first variate name display area 4a as the names of M (=10) variates belonging to the first data group 2a. Similarly, "factor F1", "factor F2", . . . , "factor F10" are displayed in the second variate name display area 4b as the names of N (=10) variates belonging to the second data group 2b. Further, in the matrix display area 4c, (M×N)=(10×10) coefficients of correlation between "performance" Q1, Q2, . . . , Q10 which are 10 variates belonging to the first data group 2a and "factor" F1, F2, . . . , F10 which are 10 variates belonging to the second data group 2b are displayed as matrix elements arranged in 10 rows and 10 columns.

Figure 5A:
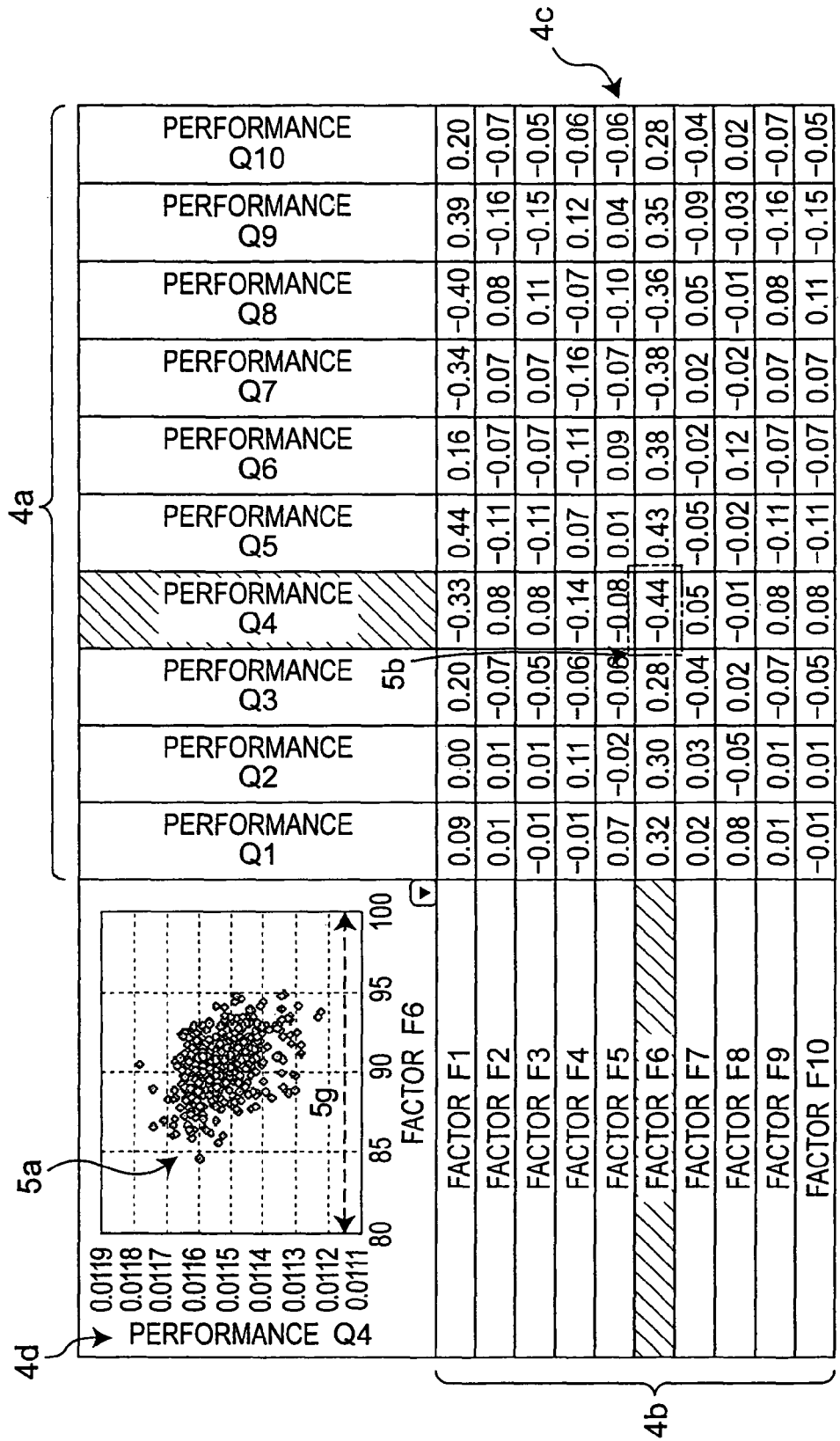
FIG. 5A is a view explaining how to change the specification of matrix elements to the row direction during analytical operation with use of the graph plotting device.

Next, in Step S3 of FIG. 11, the graph plotting template section 3 determines whether or not any matrix element is specified by the operator with use of the analytical operation section 1g. If a matrix element is specified (YES in S3), then the procedure proceeds to Step S4 where a graph targeting the specified matrix element is computed and displayed in the graph display area 4d as shown in FIG. 5A. In this example, corresponding to the specified matrix element 5b in the sixth row and fourth column (i.e., coefficient of correlation "−0.44") among the matrix elements displayed in the matrix display area 4c on the display screen, a scatter diagram 5a showing the correlation between the performance Q4 corresponding to the column (fourth column) and the factor F8 corresponding to the row (sixth row) is displayed.

In this case, the operator has only to specify any one of the matrix elements displayed in the matrix display area 4c on the display screen via the analytical operation section 1g in order to simultaneously specify a variate belonging to the first data group 2a and a variate belonging to the second data group 2b corresponding to the specified matrix element. The relation between the two specified variates can be displayed so as to be easy to see. Therefore, the operator can efficiently extract the relation between two desired variates from a large amount of data of many kinds, and can display the relation so as to be clear and easy to see. As a result, ranking by the relation (coefficient of correlation in this example) between the variates in the two groups is facilitated, which allows easy analysis of relations such as trade-off relations between multivariates.

Figure 7A:
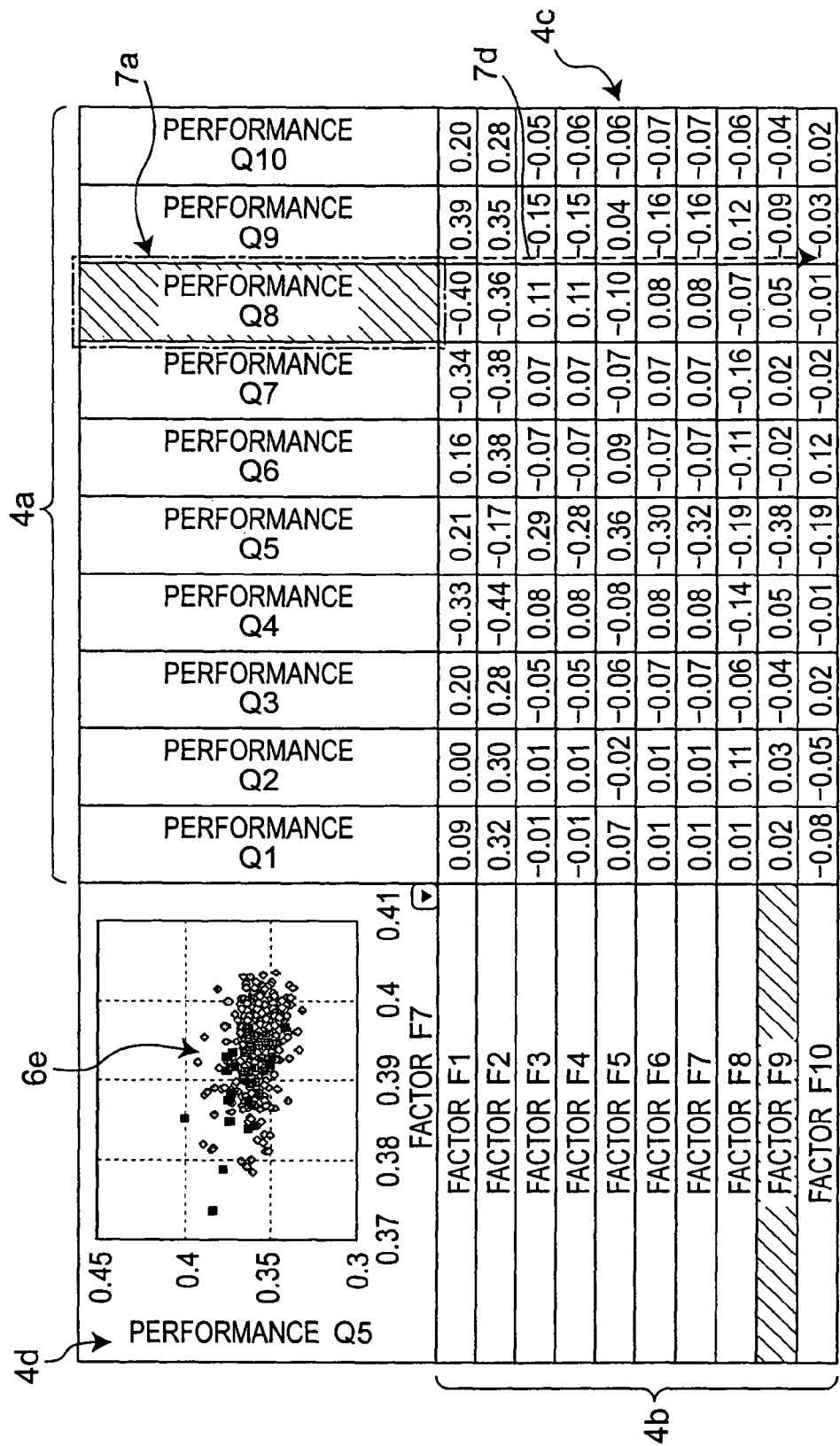
FIG. 7A is a view explaining how to change the arrangement order of matrix elements during analytical operation with use of the graph plotting device.
Figure 7B:
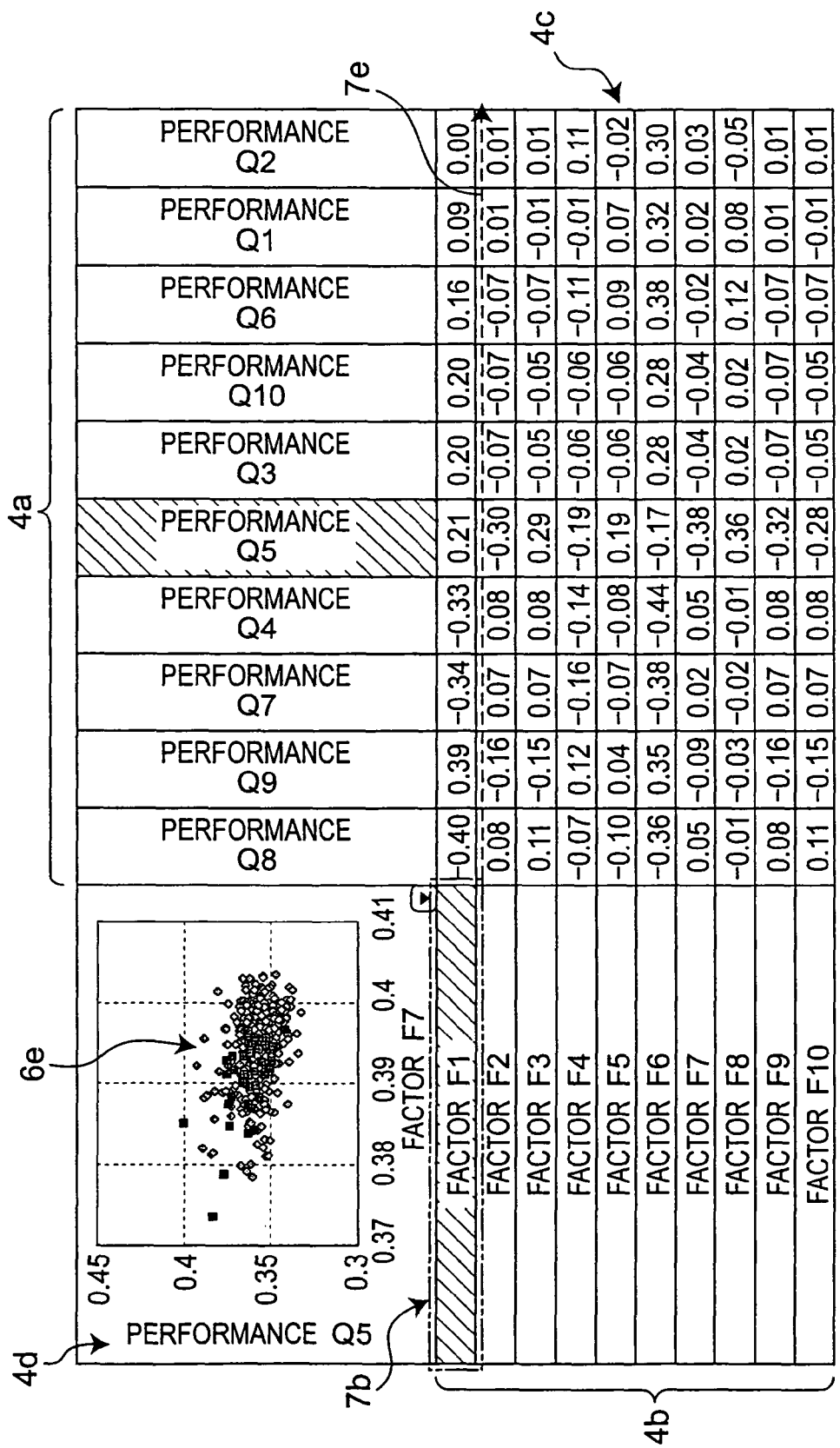
FIG. 7B is a view explaining how to change the arrangement order of matrix elements during analytical operation with use of the graph plotting device.

Next, in Step S5 of FIG. 11, the graph plotting template section 3 determines whether or not any variate name is specified by the operator with use of the analytical operation section 1g as a variate name specification section. More specifically, it is determined whether or not the variate name 7a ("performance Q8" in this example) displayed in the first variate name display area 4a is specified as shown in FIG. 7A, or whether or not the variate name 7b ("factor F1" in this example) displayed in the second variate name display area 4b is specified as shown in FIG. 7B. If no specification of the variate name is specified (NO in S5), then the procedure promptly returns to Step S3. If a variate name is specified (YES in S5), then the graph plotting template section 3 functions as an arrangement order processing section to rearrange matrix elements in order of absolute values of the statistics with respect to the specified variate name. More specifically, when the variate name 7a displayed in the first variate name display area 4a is specified as shown in FIG. 7A, the statistics displayed in the matrix display area 4c are rearranged per row so that N statistics lined in column direction with respect to "performance Q8", whose variate name is specified, may be arrayed in order of absolute values (descending order in this example). Alternatively, when the variate name 7b displayed in the second variate name display area 4b is specified as shown in FIG. 7B, the statistics displayed in the matrix display area 4c are rearranged per column so that M statistics lined in row direction with respect to "factor F1", whose variate name is specified, may be arrayed in order of absolute values (descending order in this example). As a result, the operator can clearly and easily understand the ranking by the relation between the variates of the two groups, i.e., by the coefficient of correlation in this example.

It is to be noted that the order of rearrangement can be switched between ascending order and descending order upon operation of the analytical operation section 1g by the operator. The operator may select either the ascending order or the descending order depending on the properties of the variate belonging to the first data group 2a and the variate belonging to the second data group 2b. The operator can also restore the previous order by operating the analytical operation section 1g.

When the procedure is returned to Step S4 from Step S5 or S6 through Step S3 in FIG. 11, i.e., when any one of matrix element is already specified among the matrix elements displayed in the matrix display area 4c on the display screen, processing is performed in Step S4, more specifically the processing as shown in the flow of FIG. 12 is performed.

First, in Step S11 of FIG. 12, the graph plotting template section 3 determines whether or not the matrix element (targeted matrix element) corresponding to the graph image already on display is identical to a currently specified matrix element. If both the elements are identical (YES in S11), then the procedure is promptly returned to a main routine (FIG. 11), since it is not necessary to change the graph image on display. If the matrix element (targeted matrix element) corresponding to the graph image already on display is different from the currently specified matrix element (NO in S11), then it is determined in Step S12 whether or not the rows of both the elements are identical. If both the rows are identical (YES in S12), the scale with respect to the horizontal axis is maintained and only the variate with respect to the vertical axis is changed to compute a graph (S13), and the obtained graph image is displayed in the graph display area 4d (S17). Next, if both the rows are not identical (No in S12), then it is determined in Step S14 whether or not both the columns are identical. If both the columns are identical (YES in S14), the scale with respect to the vertical axis is maintained and only the variate with respect to the horizontal axis is changed to compute a graph (S15), and the obtained graph image is displayed in the graph display area 4d (S17). If the rows and the columns are both different (NO in S12 and NO in S14), then in Step S16, both the variates with respect to the vertical axis and the horizontal axis are changed to compute a graph (S17), and the obtained graph image is displayed in the graph display area 4d (S17).

With such processing, the following analytical operation can be conducted easily and quickly.

Figure 5B:
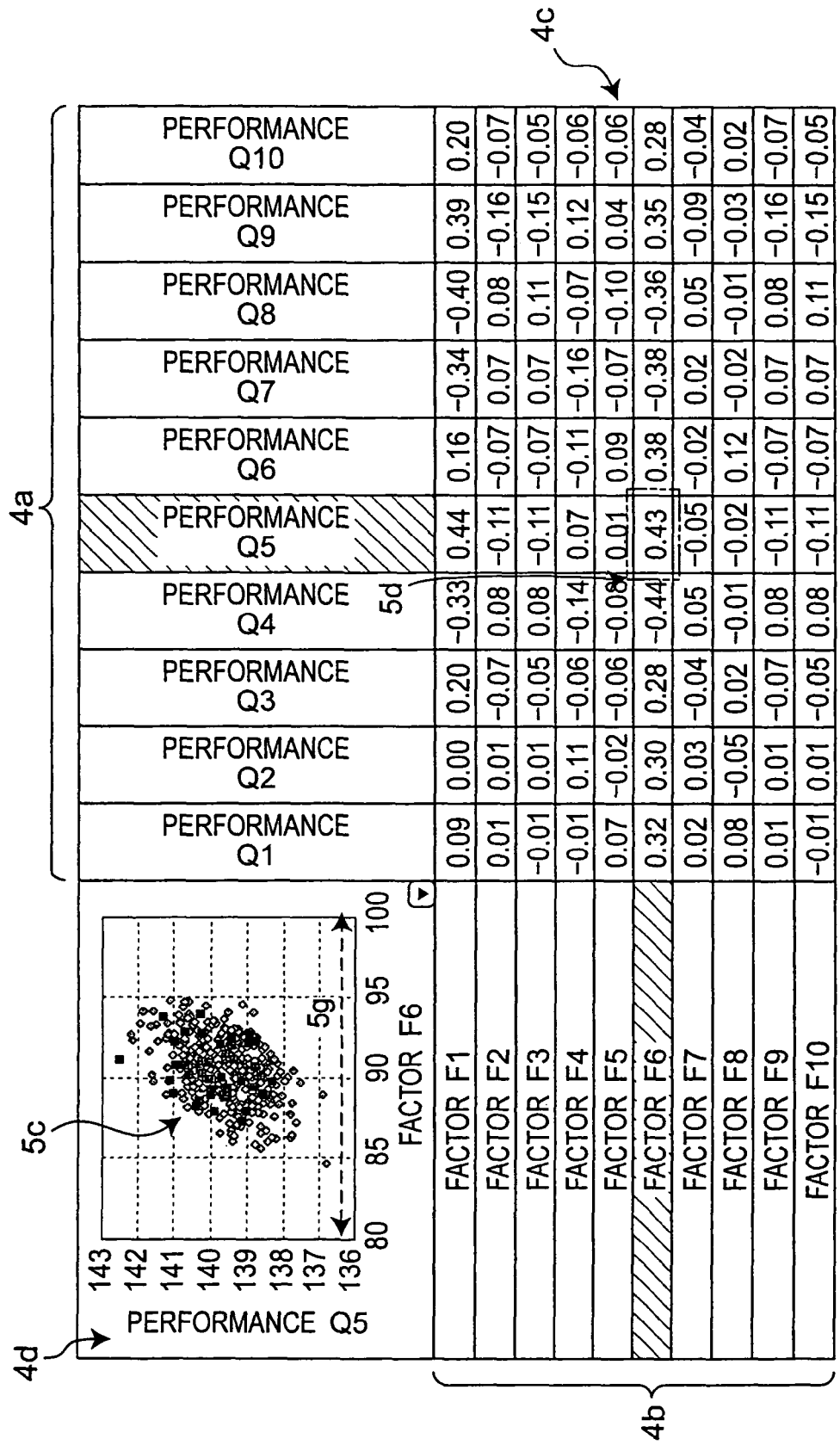
FIG. 5B is a view explaining how to change the specification of matrix elements to the row direction during analytical operation with use of the graph plotting device.
Figure 5C:
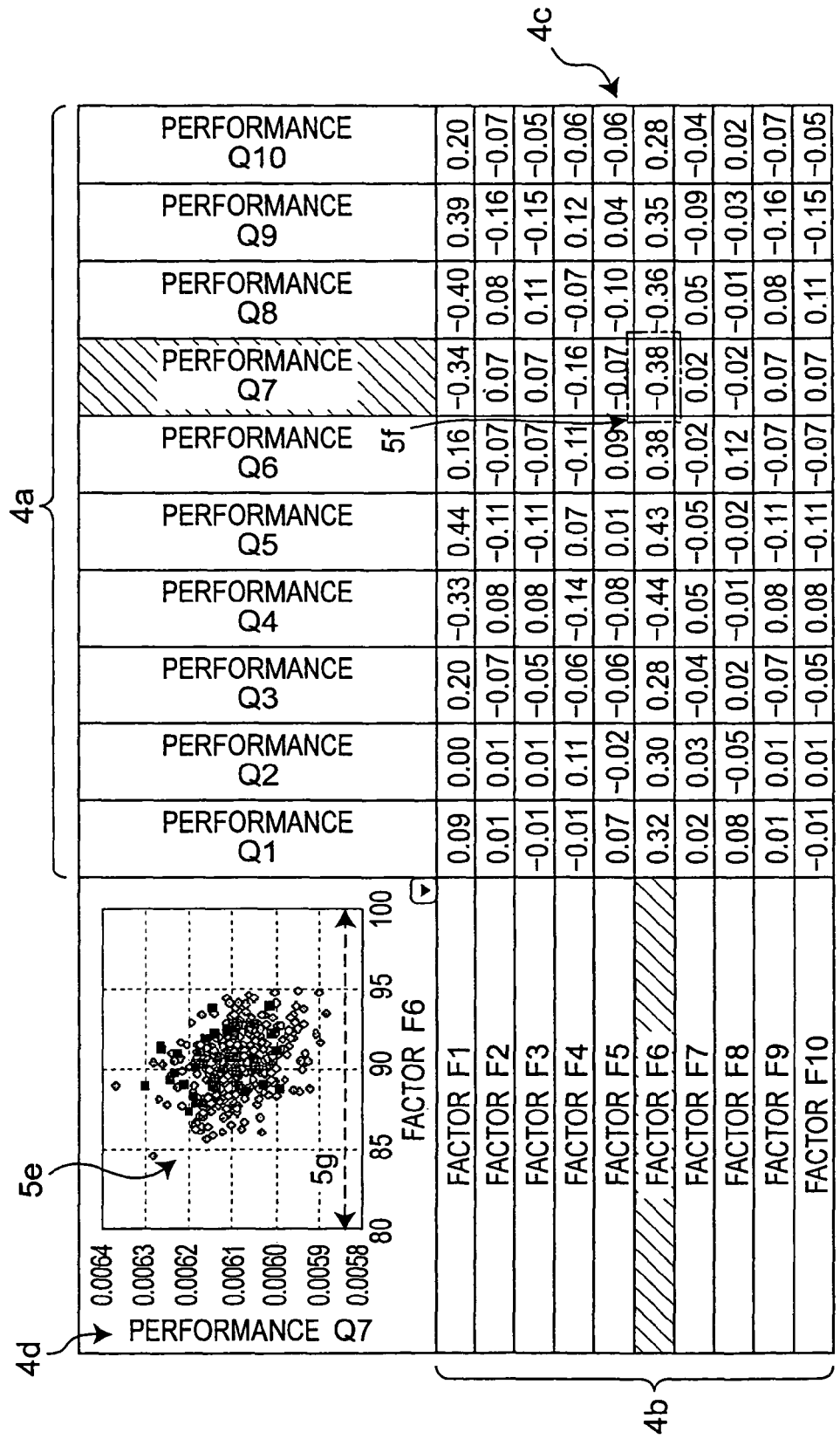
FIG. 5C is a view explaining how to change the specification of matrix elements to the row direction during analytical operation with use of the graph plotting device.

For example, it is assumed that the operator specifies a matrix element in the sixth row and fifth column as showed FIG. 5B in place of the targeted matrix element (in the sixth row and fourth column) in FIG. 5A. Since the newly specified element is in the same sixth row and only the column is changed from the fourth column to the fifth column, the graph plotting template section 3 maintains the scales 5g with respect to the horizontal axis and changes only the variate with respect to the vertical axis from performance Q4 to performance Q5 for computing and displaying a graph. Next, it is assumed that the operator specifies a matrix element in the sixth row and seventh column as showed FIG. 5C in place of the targeted matrix element (in the sixth row and fifth column) in FIG. 5B. When the procedure returns to Step S4, the graph plotting template section 3 again maintains the scales 5g with respect to the horizontal axis and changes only the variate with respect to the vertical axis from performance Q5 to performance Q7 for computing and displaying a graph, since the newly specified element is in the same sixth row and only the column is changed from the fifth column to the seventh column.

Figure 6A:
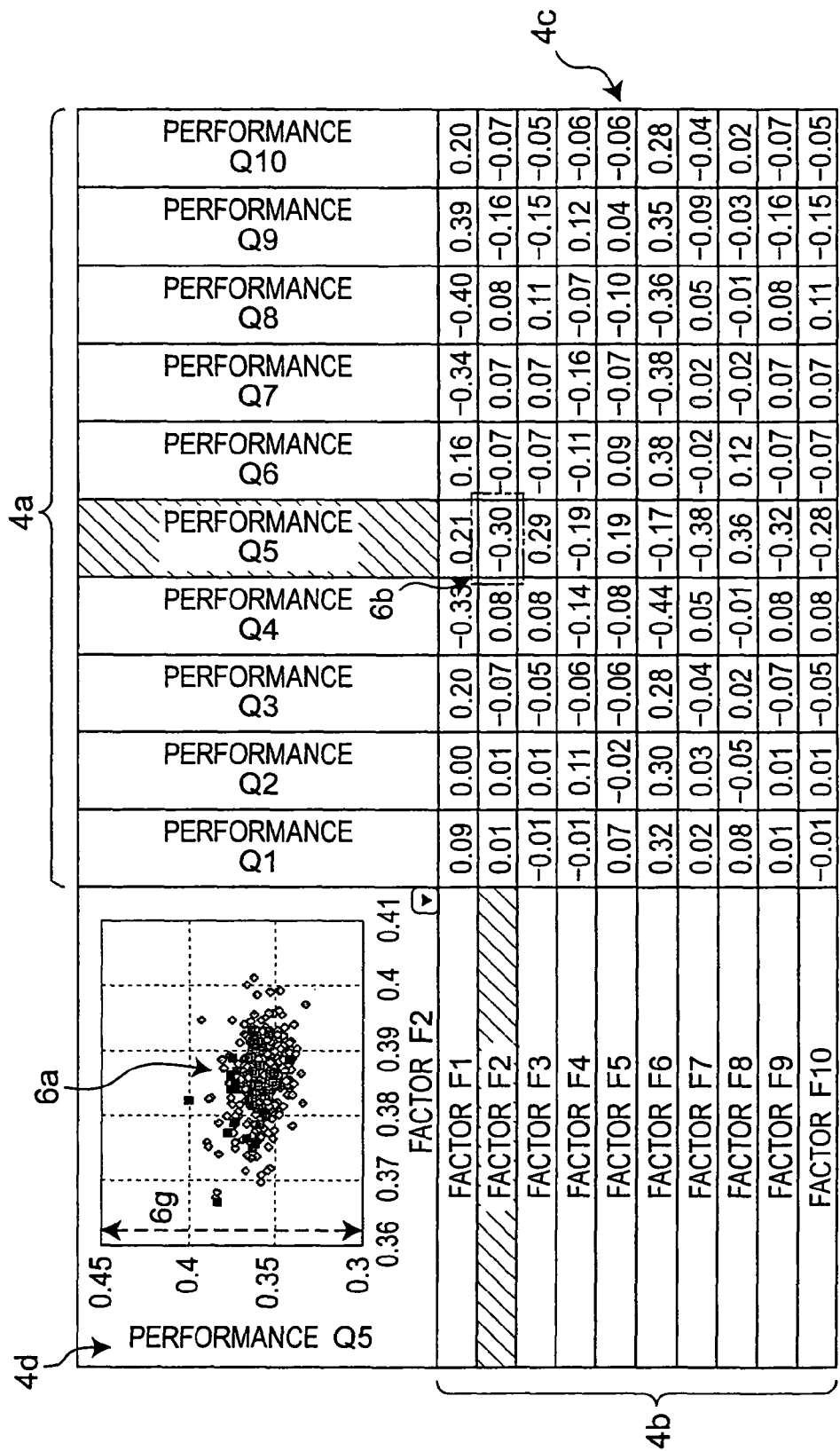
FIG. 6A is a view explaining how to change the specification of matrix elements to the column direction during analytical operation with use of the graph plotting device.
Figure 6B:
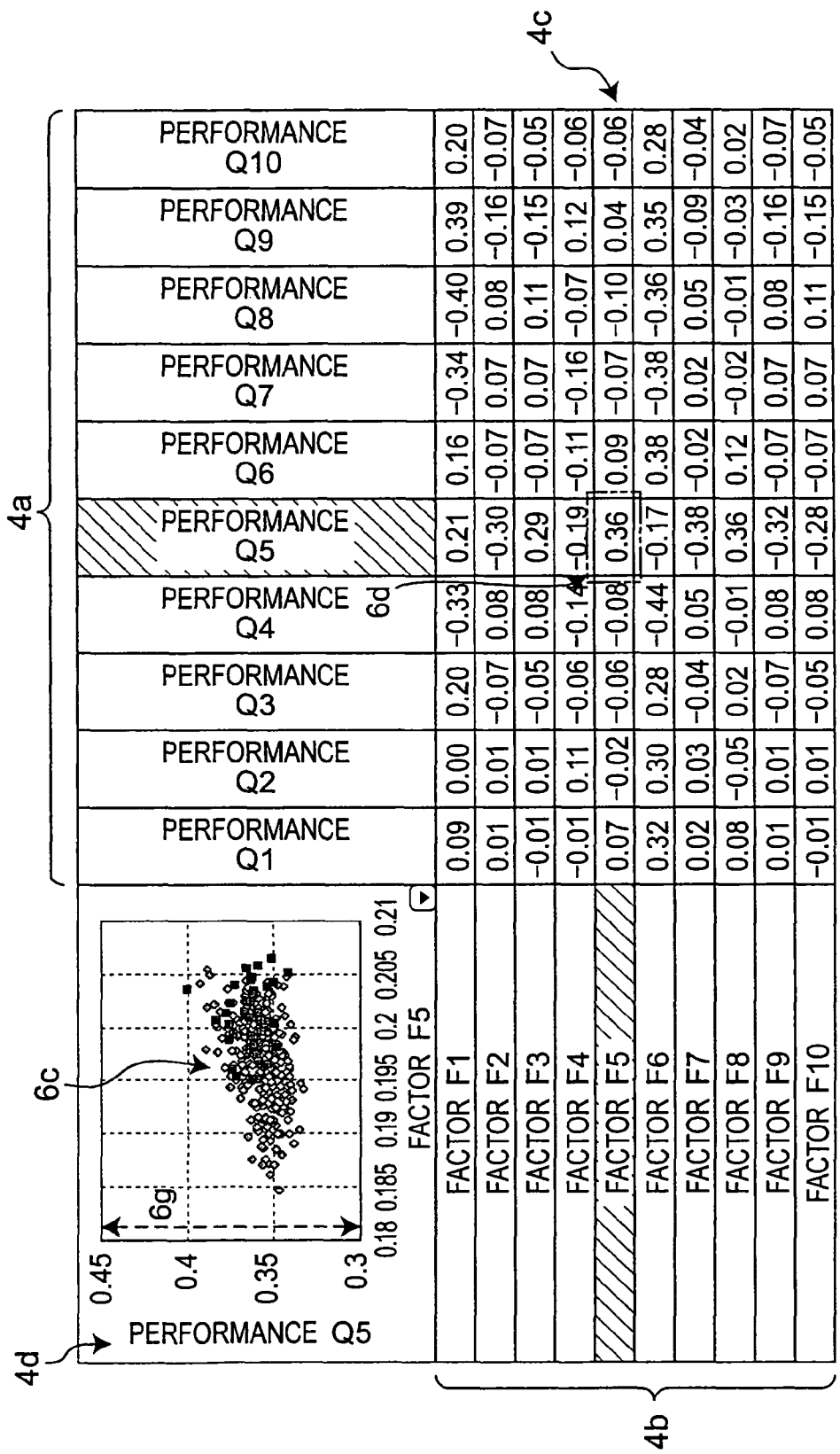
FIG. 6B is a view explaining how to change the specification of matrix elements to the column direction during analytical operation with use of the graph plotting device.
Figure 6C:
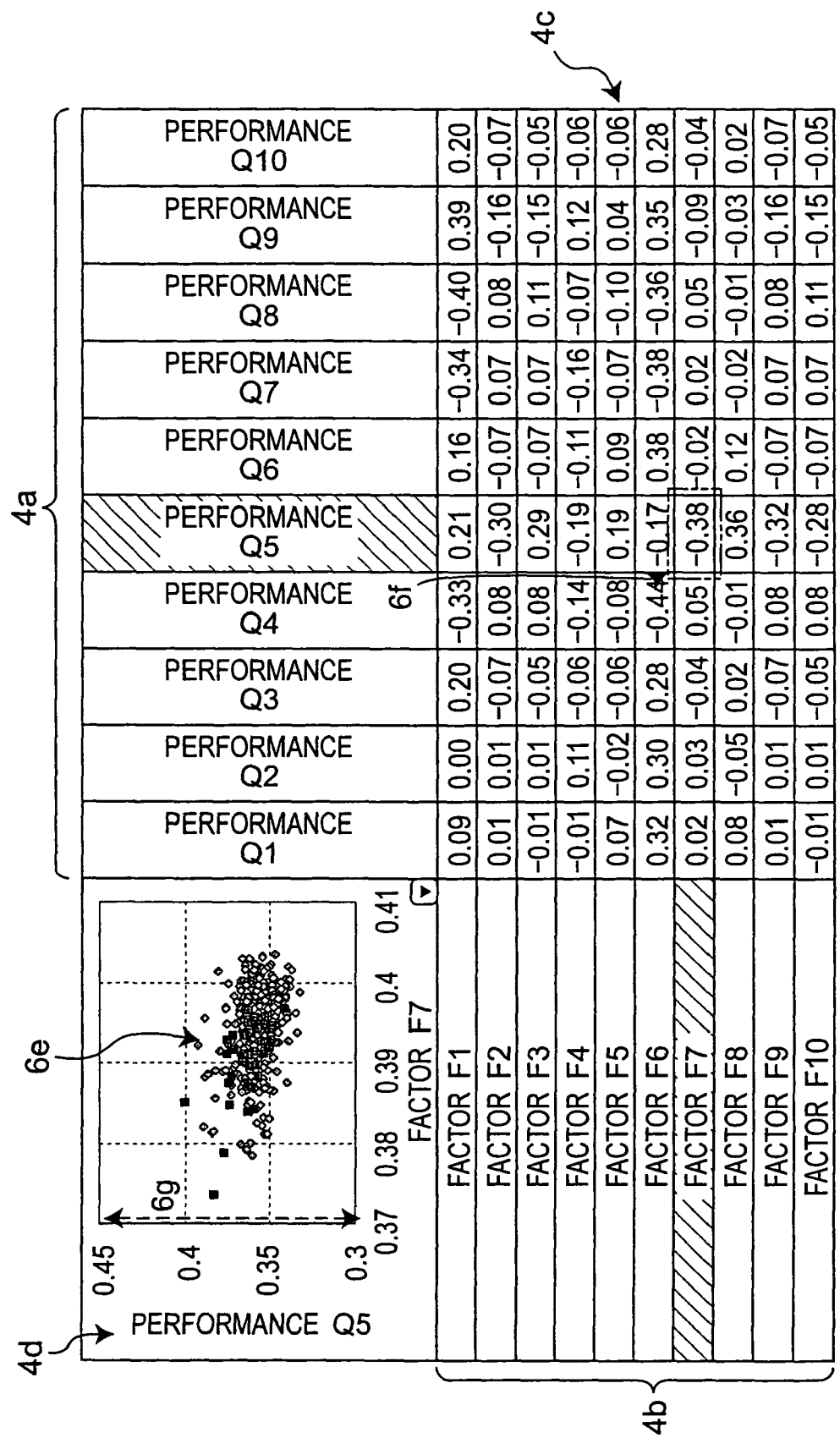
FIG. 6C is a view explaining how to change the specification of matrix elements to the column direction during analytical operation with use of the graph plotting device.

It is also assumed that the operator specifies a matrix element in the fifth row and fifth column as showed FIG. 6B in place of the targeted matrix element (in the second row and fifth column) in FIG. 6A. Since the newly specified element is in the same fifth column and only the row is changed from the second row to the fifth row, the graph plotting template section 3 maintains the scales 6g with respect to the vertical axis and changes only the variate with respect to the horizontal axis from factor F2 to factor F5 for computing and displaying a graph. Next, it is assumed that the operator specifies a matrix element in the seventh row and fifth column as showed FIG. 6C in place of the targeted matrix element (in the fifth row and fifth column) in FIG. 6B. When the procedure returns to Step S4, the graph plotting template section 3 maintains the scales 6g with respect to the vertical axis and changes only the variate with respect to the horizontal axis from factor F5 to factor F7 for computing and displaying a graph, since the newly specified element is in the same fifth column and only the row is changed from the fifth row to the seventh row.

If such change of only the column or of only the row is conducted in sequence, the operator can easily recognize the tendency of change of the graph image on the graph display area 4d relating to such change on the same display screen.

Therefore, it becomes possible to extract the defective factor of products and the like with ease and high accuracy.

Although in the above-mentioned graph plotting method, a graph image is not displayed in the graph display area 4d when the processing of Step S2 in FIG. 11 is executed, the present invention is not limited to this configuration. For example, a specific matrix element in the matrix display area 4c, e.g., a matrix element generally in the center, is specified by default, and a scatter diagram showing the correlation between the performance and the factor corresponding to a column and a row corresponding to the specified matrix element may be displayed.

It is to be noted that the above-mentioned graph plotting method may be constructed as a program for allowing a computer to execute.

Such a program may be recorded on a computer-readable recording media such as CD-ROMs for distribution. Installing the program in a general-purpose computer enables the general-purpose computer to perform the graph plotting method.

Second Embodiment

In the semiconductor product manufacturing field, each product lot is sequentially processed in a plurality of the manufacturing steps to produce products. In each manufacturing step, a plurality of manufacturing machines capable of performing the respective manufacturing step are often used concurrently. Accordingly, when the yield of product lots falls, it is important to promptly analyze which manufacturing machine (operator) has a defective factor.

FIG. 9 is a view showing an example of the content of a link data table 8 storing the data targeted for graph plotting by the graph plotting device 1. In this example, the link data table 8 stores "performance" Q1, Q2, . . . QM as M variates belonging to a first data group 8a and "process name" P1, P2, . . . , PO as O variates belonging to a second data group 8b so as to be associated with (linked to) each other for every product lot, Lt1, Lt2, . . . , LtL.

In an example in the semiconductor manufacturing field, the data represented by "performance" Q1, Q2, . . . , QM is, for example, the performance of a device obtained by wafer test, electric characteristics test and the like. The data represented by "process name" P1, P2, . . . , PO is, for example, machine numbers of the manufacturing machines used in the manufacturing step denoted by the pertinent "process name", operator names and the like. The data represented by the "process name" is provided from a server (including a processing history information database) which manages product lots.

Each product lot is specified by L "product IDs" Lt1, Lt2, . . . , LtL as common identifiers 2c. In short, in the link data table 2, "performance" Q1, Q2, . . . , QM as M variates and "process name" P1, P2, . . . , PO as O variates are associated per row by L identifiers (lot numbers) Lt1, Lt2, . . . , LtL.

In the present embodiment, a yield analyzing method is described which contributes to prompt analysis to identify which manufacturing machine has a defective factor by performing graph plotting with the graph plotting device 1 based on the link data table 8 in FIG. 9.

In the case of using the link data table 8 in FIG. 9, the display content as shown in FIG. 8A is displayed in a matrix display area 9c, a first variate name display area 9a, a second variate name display area 9b, and a graph display area 9d in a graph plotting template 9. It is to be noted that M=10 and O=10.

In the matrix display area 9c, by the data arrangement function section 1c and the statistic calculation function section 1b functioning as a statistic display processing section, (M×N) statistics, which is (M×N) statistics between "performance" Q1, Q2, . . . , Q10 that are 10 variates belonging to the first data group 2a and "process name" P1, P2, . . . , P10 that are 10 variates belonging to the second data group 2b in this example, are displayed as matrix elements arranged in 10 rows and 10 columns. In this example, the statistics to be displayed are variance ratios (computed based on multiple regression analysis by statistic calculation function section 1b) of the "performance" obtained for every manufacturing machine which performs the manufacturing step denoted by the pertinent "process name". Therefore, the operator can easily select, for example, larger variance ratios among the displayed variance ratios.

In the first variate name display area 9a, the graph plotting template section 3 functions as a variate name display processing section so that the names of 10 variates belonging to the first data group 2a, that is, "performance Q1", "performance Q2", . . . , "performance Q10" in this example, are displayed so as to be arranged in row direction corresponding to each column of the matrix display area 9c. Similarly, in the second variate name display area 9b, the names of 10 variates belonging to the second data group 2b, that is, "process name P1", "process name p2", . . . , "process name P10" in this example, are displayed so as to be arranged in column direction corresponding to each row of the matrix display area 9c. Consequently, seeing the names of the variates displayed in the first and second variate name display areas 9a, 9b allows the operator to easily recognize which data group respective variates that constitute the statistics displayed on the matrix display area 9c belong to.

In the graph display area 9d, the graph output function section 1d functions as a graph display processing section to display a graph image showing the relation between two variates, one of which belongs to the first data group 2a and the other of which belongs to the second data group 2b. In this example, the operator uses the analytical operation section 1g as a matrix element specification section, so that corresponding to the specified matrix element 8e in the third row and fourth column (i.e., variance ratio "18.74") among the matrix elements displayed in the matrix display area 9c on the display screen, "performance" Q4 obtained for every manufacturing machine, CS_02, CS_03, and CS_04, which performs the manufacturing step represented by the "process name" P3 of the pertinent column, is displayed as a boxplot.

Figure 8B:
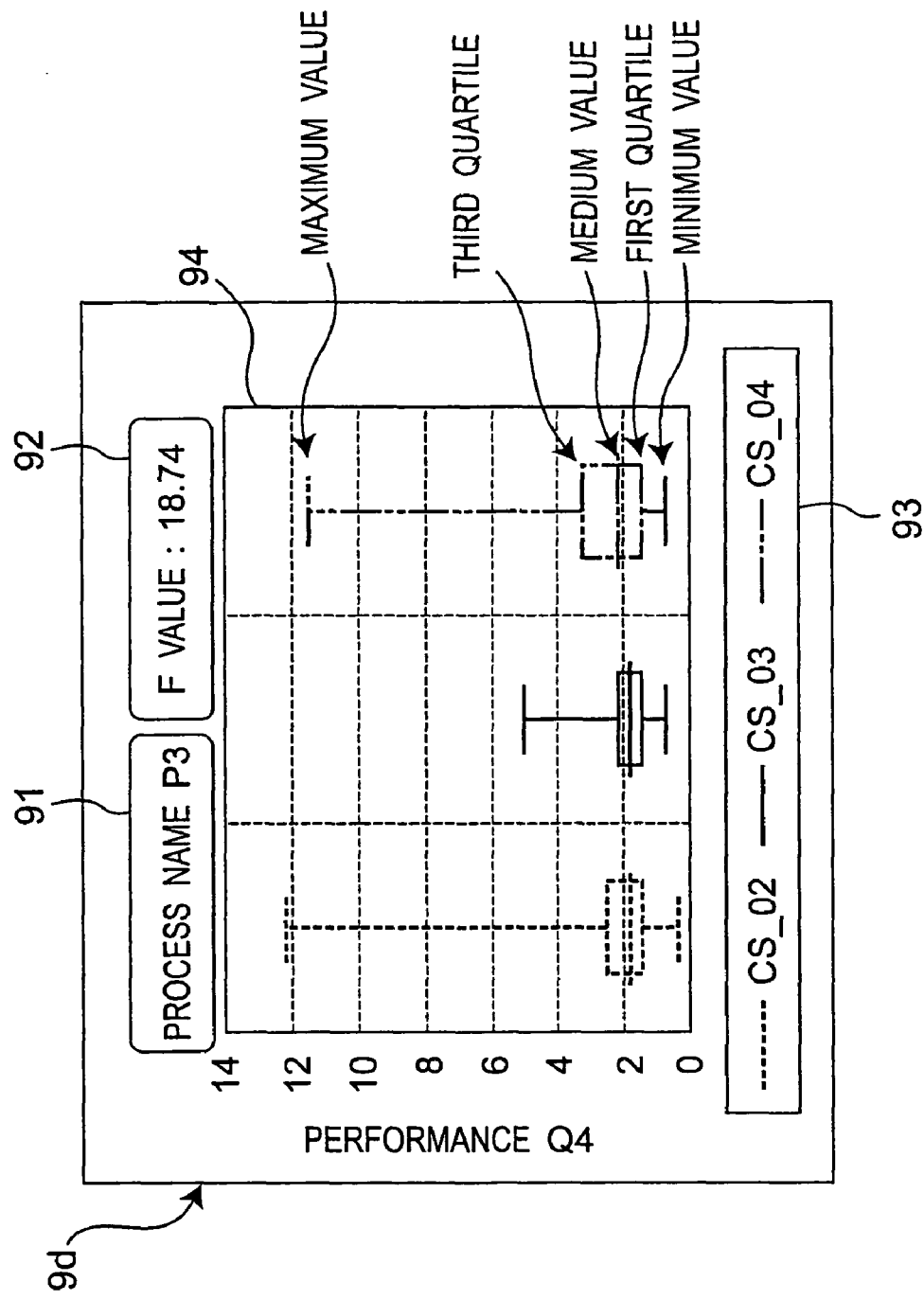
FIG. 8B is an enlarged view showing a graph display area in the graph plotting template of FIG. 8A.

More specifically, as shown in FIG. 8B, the graph display area 9d includes an area 91 showing the process name ("process name P3" in this example) corresponding to the specified matrix element 8e, an area 92 showing the variance ratio (F value; "18.74" in this example) which is the matrix element 8e, an area 93 showing the machine number of each manufacturing machine, CS_02, CS_03 and CS_04, which performs the manufacturing process represented by the pertinent "process name" P3, and an area 94 showing "performance" Q4 for every manufacturing machine, CS_02, CS_03 and CS_04, in the form of a boxplot. As is commonly known, the boxplot is expressed with a maximal value, a third quartile, a medium value, a first quartile, and a minimum value.

As shown in FIG. 8A, after the above-mentioned display contents are respectively displayed in the matrix display area 9c, the first variate name display area 9a, the second variate name display area 9b and the graph display area 9d of the graph plotting template 9, analytical operation is executed in the same way as being described with reference to the flow of FIG. 11 and FIG. 12 with respect to the first embodiment.

In this case, the operator has only to specify any one of the matrix elements displayed in the matrix display area 9c on the display screen via the analytical operation section 1g in order to simultaneously specify a variate belonging to the first data group 8a and a variate belonging to the second data group 8b corresponding to the specified matrix element. The relation between the two specified variates can be displayed so as to be easy to see. More specifically, corresponding to a specified matrix element displayed in the matrix display area 9c on the display screen, the "performance" obtained for every manufacturing machine which carries out the manufacturing step represented by the "process name" of the pertinent column is displayed as a boxplot. Therefore, the operator can efficiently extract the "performance" and further, the yield of a product lot depending on each manufacturing machine from a large amount of data of many kinds. As a result, the operator can clearly understand which defective factor (manufacturing machine) causes deterioration of the performance on one screen.

Moreover, if only the column or only the row is changed in sequence in specifying matrix elements in the matrix display area 9c, the operator can easily recognize the tendency of change of the graph image on the graph display area 9d relating to such column or row change on the same display screen. Therefore, it becomes possible to extract the defective factor of products and the like with ease and high accuracy.

As a result, the user can extract a defective factor with ease and sufficient accuracy, without needing much analysis time and effort.

It is to be noted that the above-mentioned yield analyzing method may be constructed as a program for allowing a computer to execute.

Such a program may be recorded on a computer-readable recording media such as CD-ROMs for distribution. Installing the program in a general-purpose computer enables the general-purpose computer to perform the yield analyzing method.

Third Embodiment

FIG. 10 shows the entire configuration of a yield improvement support system including the graph plotting device 1 shown in FIG. 1, the system suitable for managing manufacturing processes in the fields such as the semiconductor product manufacturing field.

The yield improvement support system is composed of a manufacturing process controlling device 10b as a server for managing manufacturing processes, a test process controlling device 10c as a server for measuring and managing the semiconductor performance (yield) of product lots, and a yield factor analyzing device 10a including the aforementioned graph plotting device 1, each of which can communicate with each other via a data communication channel 10d.

The manufacturing process controlling device 10b includes a database 10e for storing processing history data and process data which are variates relating to the manufacturing processes. The test process controlling device 10c includes a database 10f for storing measured semiconductor performance.

In this example, the yield factor analyzing device 10a is structured to constitute the graph plotting device 1, by combining a computer-readable recording medium storing a program for performing the aforementioned graph plotting method with a general-purpose computer which reads the recording medium and executes the program.

A semiconductor performance data group I1 as variates representing performance sent from the test process controlling device 10c and a process data group I2 as variates representing defective factors in the manufacturing process sent from the manufacturing process controlling device 10b are each periodically distributed to the yield factor analyzing device 10a via the data communication channel 10d. The yield factor analyzing device 10a loads those data groups I1 and I2 into the link data table (see FIG. 2) of the graph plotting device 1.

The yield factor analyzing device 10a extracts a defective factor of a product while displaying a graph image representing the relation between two variates, one of which belongs to the semiconductor performance data group I1 and the other of which belongs to the process data group I2 in the graph display area on the display screen with the graph plotting device 1. Then, the yield factor analyzing device 10a functions as a defective factor feedback section to feed back information I3 representing the extracted defective factor to the manufacturing process controlling device 10b via the data communication channel 10d. Therefore, the cause of abnormality in the manufacturing process can be eliminated. As a result, the manufacturing process can be stabilized and thereby the improvement in the yield can be supported.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A graph plotting device comprising:

a display area setting section which sets a matrix display area for displaying m×n elements arranged in matrix form wherein m and n are respectively two or more natural numbers and a graph display area for displaying a graph image in an identical display screen;

a statistic display processing section which computes m×n statistics between m variates belonging to a first data group and n variates belonging to a second data group and which displays the statistics as matrix elements arranged in n rows and m columns in the matrix display area;

a matrix element specification section for specifying any one of the matrix elements displayed in the matrix display area on the display screen; and a graph display processing section which forms a graph image representing a relation between two variates, one of which belongs to the first data group and the other of which belongs to the second data group, corresponding to one matrix element specified by the matrix element specification section, and which displays the graph image in the graph display area on the display screen, wherein the display area setting section sets a first variate name display area which displays names of m variates belonging to the first data group so as to be arranged in row direction corresponding to each column in the matrix display area, and a second variate name display area which displays names of n variates belonging to the second data group so as to be arranged in column direction corresponding to each row in the matrix display area, and wherein the graph plotting device further comprising a variate name display processing section which displays the names of m variates and the names of n variates in the first and second variate name display areas, respectively;

a variate name specification section which specifies any one of the names of m variates or the names of n variates; and an arrangement order processing section which rearranges statistics displayed in the matrix display area by each row so that when one of the names of m variates is specified by the variate name specification section, n statistics lined in column direction with respect to the variate whose name is specified are arranged in order of absolute values, while rearranging statistics displayed in the matrix display area by each column so that when one of the names of n variates is specified by the variate name specification section, m statistics lined in row direction with respect to the variate whose name is specified are arranged in order of absolute values.

2. The graph plotting device according to claim 1, wherein each of the statistics is a coefficient of correlation between the variate belonging to the first data group and the variate belonging to the second data group.

3. The graph plotting device according to claim 1, further comprising:
a link data table for storing m variates belonging to the first data group and n variates belonging to the second data group in a state of being associated to each other with use of a common identifier, wherein
the statistic display processing section computes the m×n statistics by referring to a memory content of the link data table.

4. The graph plotting device according to claim 3, further comprising:
a server which periodically distributes m variates belonging to the first data group and n variates belonging to the second data group to the link data table so as to update the memory content of the link data table, wherein
the statistic display processing section computes the m×n statistics in synchronization with the update of the memory content of the link data table and displays the statistics in the matrix display area.

5. The graph plotting device according to claim 1, wherein the display area setting section sets the matrix display area and the graph display area as a template incorporated into one frame.

6. The graph plotting device according to claim 1, wherein the matrix element specification section specifies any one of the matrix elements on the display screen.

7. The graph plotting device according to claim 1, wherein the graph image is displayed in the graph display area with a first coordinate axis expressing the variates belonging to the first data group and a second coordinate axis expressing the variates belonging to the second data group as references, and wherein
when specification is changed from the one matrix element into the another matrix element by the matrix element specification section, the graph display processing section determines whether or not a row or a column of the one matrix element coincides with that of the another matrix element, and if the row of the one matrix element coincides with the row of the another matrix element, a scale of the second coordinate axis is maintained, whereas if the column of the one matrix element coincides with the column of the another matrix element, a scale of the first coordinate axis is maintained, while a graph image representing a relation between two variates, one of which belongs to the first data group and the other of which belongs to the second data group, and corresponding to the another matrix element, is formed.

8. A yield improvement support system comprising said graph plotting device according to claim 1 for eliminating a cause of abnormality in manufacturing process for manufacturing a certain product, wherein
the first data group is a data group representing performance of the product, while the second data group is a data group representing a defective factor of the product,
the yield improvement support system further comprising:
a defective factor feedback section which extracts a defective factor of the product while displaying a graph image representing a relation between two variates, one of which belongs to the data group representing the performance and the other of which belongs to the data group representing the defective factor, in the graph display area on the display screen with the graph plotting device, and
which outputs the extracted defective factor as a feedback to the manufacturing process.

9. A graph plotting method, comprising steps for:
setting a matrix display area for displaying m×n elements arranged in matrix form wherein m and n are respectively two or more natural numbers and a graph display area for displaying a graph image in an identical display screen, and further setting a first variate name display area which displays names of m variates belonging to the first data group so as to be arranged in row direction corresponding to each column in the matrix display area, and a second variate name display area which displays names of n variates belonging to the second data group so as to be arranged in column direction corresponding to each rowing the matrix display area;
displaying the names of m variates and the names of n variates in the first and second name display areas, respectively, computing m×n statistics between m variates belonging to a first data group and n variates belonging to a second data group and displaying the statistics as matrix elements arranged in n rows and m columns in the matrix display area;
specifying any one of the matrix elements displayed in the matrix display area on the display screen by a matrix element specification section;
forming a graph image representing a relation between two variates, one of which belongs to the first data group and the other of which belongs to the second data group, corresponding to one matrix element specified by the matrix element specification section, and displaying the graph image in the graph display area on the display screen;
specifying any one of the names of m variates or the names of n variates by a variate name specification section; and
rearranging statistics displayed in the matrix display area by each row so that when one of the names of m variates is specified by the variate name specification section, n statistics lined in column direction with respect to the variate whose name is specified are arranged in order of absolute values, while rearranging statistics displayed in the matrix display area by each column so that when one of the names of n variates is specified by the variate name specification section, m statistics lined in row direction with respect to the variate whose name is specified are arranged in order of absolute values.

10. A yield analyzing method for analyzing a cause of abnormality in manufacturing process for manufacturing a certain product by executing said graph plotting method according to claim 9, wherein the first data group is a data group representing performance of the product, while the second data group is a data group representing a defective factor of the product, the yield analyzing method further comprising a step for:
extracting a defective factor of the product while executing the graph plotting method to display a graph image representing a relation between the two variates, one of which belongs to the data group representing the performance and the other of which belongs to the data group representing the defective factor, in the graph display area on the display screen.

11. The yield analyzing method according to claim 10, wherein the graph image is a boxplot relating to the variate belonging to the data group representing the performance which depends on the variate belonging to the data group representing the defective factor.

12. A non-transitory computer-readable recording medium encoded with a computer program for enabling a computer to perform the graph plotting method according to claim 9.

13. A non-transitory computer-readable recording medium encoded with a computer program for enabling a computer to perform the yield analyzing method according to claim 10.

* * * * *